US006442694B1

(12) United States Patent
Bergman et al.

(10) Patent No.: US 6,442,694 B1
(45) Date of Patent: Aug. 27, 2002

(54) FAULT ISOLATION FOR COMMUNICATION NETWORKS FOR ISOLATING THE SOURCE OF FAULTS COMPRISING ATTACKS, FAILURES, AND OTHER NETWORK PROPAGATING ERRORS

(75) Inventors: Ruth Bergman, Lexington, MA (US); Muriel Medard, Champaign, IL (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/031,899

(22) Filed: Feb. 27, 1998

(51) Int. Cl.$^7$ .................................................. G06F 11/30
(52) U.S. Cl. ........................... 713/201; 714/57; 709/224
(58) Field of Search ................................ 713/200, 201; 709/223, 224; 714/48, 25, 57

(56) References Cited

U.S. PATENT DOCUMENTS

| | | | | |
|---|---|---|---|---|
| 5,127,006 A | * | 6/1992 | Subramanian et al. | 714/35 |
| 5,276,440 A | * | 1/1994 | Jolissaint et al. | 340/825.02 |
| 5,636,203 A | * | 6/1997 | Shah | 714/25 |
| 5,812,758 A | * | 9/1998 | Laureanno | 714/25 |
| 5,919,258 A | * | 7/1999 | Kayashima et al. | 713/201 |

OTHER PUBLICATIONS

"Analysis Of Centralized Network Restoration", C. Edward Chow, et al., pp. 306–310, date unknown.
"A Novel Approach to Automatic Protection Switching Using Trees", Steven G. Finn, Massachusetts Institute of Technology, Muriel M. Médard, Richard A. Barry, MIT Lincoln laboratory, date unknown.
"On the Connection Assignment Problem of Diagnosable Systems", Franco P. Preparta, et al., IEEE Transactions on Electronic Computers, vol. E.C. 16, No. 6, Dec. 1967.
"Disjoint Paths in a Network", J.W. Suuballe, Bell Telephone Laboratories, Inc., Networks, 4: 125–145, © 1974 by John Wiley & Sons, Inc.
"Characterization of Connection Assignment of Diagnosable Systems", S.L. Hakimi and A.T. Amin, IEEE Transactions of Computers, pp. 86–93, Jan. 1974.

(List continued on next page.)

Primary Examiner—Gail Hayes
Assistant Examiner—Christopher A. Revak
(74) Attorney, Agent, or Firm—Daly, Crowley, & Mofford, LLP

(57) ABSTRACT

A technique for isolating faults in a communication network is described. The techniques can be utilized in high speed communications networks such as all-optical networks (AONs). The technique is distributed, requires only local network node information and can localize attacks for a variety of network applications. The technique is particularly well suited to the problem of attack propagation which arises in AONs. The technique finds application in a variety of network restoration paradigms, including but not limited to automatic protection switching and loopback protection and provides proper network operation reduced, or in some cases no data loss and bounded delay time regardless of the location of the attack or the physical span of the network. Since the technique is distributed, and its associated delays do not depend on the number of nodes in the network. Hence the technique avoids the computational complexity inherent to centralized approaches. It is thus scalable and relatively rapid. Furthermore, the delays in attack isolation do not depend on the transmission delays in the network. A network management system can therefore offer hard upper-bounds on the loss of data due to failures or attacks. Fault localization with centralized algorithms depends on transmission delays, which are proportional to the distance traversed by the data. Since the described techniques for fault localization are not dependent on centralized computations, the techniques are equally applicable to local area networks, metropolitan area networks, or wide area networks.

16 Claims, 16 Drawing Sheets

OTHER PUBLICATIONS

"On Algorithms for Enumerating all Circuits of a Graph", Prabhaker Mateti and Narsingh Deo, SIAM J. C., vol. 5, No. 1, Mar. 1976, pp. 90–99.

"Application of Information Theory to Sequential Fault Diagnosis", Pramod K Varshney, et al., IEEE Transactions on Computers, vol. C–31, No. 2, Feb. 1982, pp. 164–170.

"Sequential Fault Diagnosis of Modular Systems", Pramod K. Varshney, et al., Proceedings of the 1982 Conference on Information Sciences and Systems, p. 377.

"Totally Morphic HM Fault Model", B.L. Havlicsek, et al., Proceedings of the 1982 Conference on Information Sciences and Systems, Department of Electrical Engineering and Computer Science, pp. 378–379.

"On Fault Identification in t–Fault Diagnosable Analog Systems", V.P. Prothapalli, Proceedings of the Seventeenth Annual Conference on Information Sciences and Systems, Mar. 23–25, 1983, pp. 450–454.

"Fault Diagnosis by Linear Programming", Ramsey W. Haddad, et al., Proceedings of the Seventeenth Annual Conference on Information Sciences and Systems, Mar. 23–25, 1983, pp. 460–463.

"On Adaptive Fault Identification for Certain Classes of Diagnosable Systems", K. Nakajima, et al. Proceedings of the Seventeenth Annual Conference on Information Sciences and Systems, Mar. 23–25, 1983, p. 455.

"The PMC System Level Fault Model: Maximality Properties of the Implied Faulty Sets", G.G.L. Meyer, Proceedings of the Seventeenth Annual Conference on Information Sciences and Systems, Mar. 23–25, 1983, pp. 443–449.

"An Efficient Diagnosis Algorithm for t–Diagnosable Systems", Anton T. Dahbura, et al., Proceedings of the Seventeenth Annual Conference on Information Sciences and Systems, Mar. 23–25, 1983, pp. 456–459.

"An Efficient Algorithm for Probabilistic Fault Diagnosis", Anton T. Dahbura, Proceedings of the Nineteenth Annual Conference on Information Sciences and Systems, Mar. 27–29, 1985, p. 89.

"An $O(n^{2.5})$ Fault Identification Algorithm for Diagnosable Systems", Anton T. Dahbura, et al., IEEE Transactions on Computers, vol. C–33, No. 6, Jun. 1984, pp. 486–492.

"On the Equivalence of Fault Identification in Undirected Graph Diagnostic Models and a Transitive Closure", Dr. Fabrizio Lombardi, Proceedings of the Nineteenth Annual Conference on Information Sciences and Systems, Mar. 27–29, 1985, pp. 74–75.

"Fault Tolerance and t–Diagnosis: Affinities and Differences", Fabrizio Lombardi, Proceedings of the Nineteenth Annual Conference on Information Sciences and Systems, Mar. 27–29, 1985, pp. 76–79.

"Fault Isolation in Complex Technical Systems the Effect of Modelling Errors", Janos Gertler, Proceedings of the Nineteenth Annual Conference on Informtion Sciences and Systems, Mar. 27–29, 1985, pp. 68–73.

"A Probabilistic Causal Model for Diagnostic Problem Solving—Part I: Integrating Symbolic Causal Inference with Numeric Probabilistic Causal Model for Diagnostic problem Solving—Part I: Integrating Symbolic Causal Inference with Numeric Probabilistic Inference", Yun Peng, et al., IEEE Transactions on Systems, Man, and Cybernetics, vol. SMC–17, No. 2, Mar./Apr. 1987, pp. 146–162.

"An Engineering Approach to Model–Based Troubleshooting in Communication Networks", Naseem A. Khan, et al., IEEE Journal on Selected Areas in Communications. vol. 6, No. 5, Jun. 1988, pp. 792–799.

"Hierarchical Classification: Its usefulness for Diagnosis and Sensor Validation", B. Chandrasekaran, et al., IEEE Journal of Selected Areas in Communications, vol. 6. No. 5, Jun. 1988, pp. 884–891.

"On Testing communication Networks", Roman O. Yudkin, IEEE Journal on Selected Areas in Communications, vol. 6. No. 5, Jun. 1988, pp. 805–812.

"I–Test: Integrated Testing Expert System for Trunks", Da–Min D. Liu, et al., IEEE Journal on Selected Areas in Communications, vol. 6, No. 5, Jun. 1988, pp. 800–804.

"Expert Systems in Network Management—The Second Revolution", Lawrence Bernstein, IEEE Journal on Selected Areas in Communications, vol. 6, No. 5, Jun. 1988, pp. 784–787.

"Architectural Model for SONET End–to–End Management with Object–oriented Approach",Takeshi Nishida, et al., IEEE, 1989, pp. 1500–1505.

"Finding Maximal Link disjoint Paths in a Multigraph", Jonathan S. Whalen, IEEE, 1990, pp. 0470–0474.

"Feasibility Study of a High–Speed SONET Self–Healing Ring Architecture in Future Interoffice networks", Tsong–Ho Wu, IEEE Communications Magazine, Nov. 1990, pp. 33–51.

"AUTOREC: An Automated Error Recovery System for Network Management", Teresa Cochran, IEEE Network Magazine, Mar. 1990, pp. 14–18.

"Dynamics of Distributed Shortest–Path Routing Algorithms", William T. Zaumen, et al., ACM, 1991, pp. 31–41.

"An Algorithm for Designing Rings for Survivable Fiber Networks", Ondria J. Wasem, IEEE Transactions on Reliability, vol. 40, No. 4, Oct. 1991, pp. 428–431.

"Optimal topologies for Survivable Fiber Optic networks Using SONET Self–healing Rings", Ondria J. Wasem, IEEE 1991, pp. 2032–2038.

"A Multi–Period Design Model for Survivable Network Architecture Selection for SONET Interoffice Networks", Tsong–Ho Wu, IEEE Transactions on Reliability, vol. 40. No. 4, Oct. 1991, pp. 417–427.

"Fault Detection/Identification in the Linear Lightwave network", Ness Shroff, et al., Department of Electrical Engineering, Sep. 24, 1991.

"Improving fault detection and reliability in FDDI networks", R Radhakrishna Pillai, et al., Computer Communications, vol. 15, No. 9, Nov. 1992.

"A Novel Passive Protected SONET Bidirectional Self–Healing Ring Architecture", Tsong–Ho Wu, IEEE, Journal of Lightwave Technology, vol. 10, No. 9, Sep. 1992.

"A Resource Allocation Model for Denial of Service", Jonathan K. Millen, IEEE Computer Society Symposium on Research in Security and Privacy, May 4–6, 1992, pp. 137–146.

"A Scalable Multiwavelength Multihop Optical Network: A Proposal for Research on All–Optical Networks", Charles A. Brackett, et al., IEEE Journal of Lightwave Technology, col. 11, No. 5/6, May/Jun. 1993.

"An Algorithm for Survivable Network Design Employing Multiple Self–healing Rings", J.B. Slevinsky, et al., IEEE, 1993, pp. 1568–1573.

"A Capacity Comparison for SONET Self–Healing Ring Networks", Ching–Chir Shyur, IEEE, 1993, pp. 1574–1578.

"A Transport Network Layer Based on Optical Network Elements", G.R. Hill, et al., IEEE Journal of Lightwave Technology, vol. 11 No. 5/6, May/Jun. 1993, pp. 667–679.

"A Sampling Scheme for Estimating the Reliability of a Series System", Kamel Rekab, IEEE Transactions on Reliability, vol. 42, No. 2, Jun. 1993, pp. 287–290.

"Communication Status Analysis Method", Ichiro Watanae, Electronics and Communications in Japan, Part 1, vol. 76. No. 4, 1993, pp. 13–23.

"A passive Protected Self–Healing Mesh Network Architecture and Applications", Tsong–Ho Wu, IEEE/ACM Transactions on Networking, vol. 2, No. 1, Feb. 1924, pp. 40–52.

"Techniques for Finding Ring covers in Survivable networks", L.M. Gardner, et al., IEEE, 1994, pp. 1862–1866.

"Self–healing algorithm for logical mesh connection on ring network", M. Tomizawa, et al., Electronics Letters, Sep. 15, 1994, vol. 30, No. 19, pp. 1615–1616.

"Optimal Diverse Routing in Telecommunicaton Fiber Networks", Ramesh Bhandari, IEEE INFOCOM '94, pp. 1498–1508.

"Hierarchical Self–Healing Rings", Jianxu Shi, IEEE, 1995, pp. 690–696.

"A Resource Allocation Model for Denial of Service", Jonathan K. Millen, IEEE, 1992, pp. 137–146.

"Schemes for Fault Identification in communication Networks", Irene Katzela, et al., IEEE/ACM Transactions on Networking, vol. 3, No. 6, Dec. 1995, pp. 753–764.

"Supervision and protection concepts for an optical network", Manfred N. Huber, et al., OFC '95 Technical Digest, pp. 167–168.

"Estimating the Number of Errors In a System Using a martingale Approach", IEEE Transactions on Reliability, vol. 44, No. 2, Jun. 1995, pp. 322–326.

"Survivable Network Planning Methods and Tools in Taiwan", Ching–Chir Shyur, IEEE Communications Magazine, Sep. 1995, pp. 100–107.

"Fault Diagnosis in the Linear Lightwave Network", Irene Katzela, et al., IEEE/LEOS, Aug. 7–11, 1995, pp. 41–42.

"Operation and Maintenance from All–Optical . . . ", Mathias Bischoff, et al., IEEE Communciations Magazine, Nov. 1996, pp. 136–141.

"Consideration of Node Failures in Network–Reliability Calculation", Victor A. Netes, et al., IEEE Transactions on Reliability, vol. 45, No. 1, Mar. 1996, pp. 127–128.

"An Immunological approach to Change Detection: Algorithms, Analysis and Implications", Patrick D'haeseleer, 1996 IEEE Symposium on Security and Privacy, May 6–8, 1996, pp. 110–119.

"A Wideband All–Optical WDM Network", I.P. Kaminow, et al., IEEE Journal on Selected Areas in Communications, vol. 14, No. 5, Jun. 1996, pp. 780–799.

"Interconnection of Self–Healing Rings", James J. Shi, et al., IEEE, 1996.

"All–Optical network Consortium—Ultrafast TDM Networks", Richard A. Barry, et al., IEEE Journal on Selected Areas in Communications, vol. 14, No. 5, Jun. 1996, pp. 999–1013.

"OA&M Framework for Multiwavelength photonic Transport Networks", Yasuhiko Tada, et al., IEEE Journal on Selected Areas in Communications, vol. 14. No. 5, Jun. 1996.

"Management of a Fibre Transmission system for Video, Audio and Auxiliary Data Signals", M Piepers, International Broadcasting Convention, Sep. 12–16, 1996, pp. 414–418.

"National–Scale WDM Networking Demonstration by the MONET Consortium", R.S. Vodhanel, et al., Optical Fiber Communication Conference, 1997.

"Demonstration of a Re–Configurale Wavelength–Routed Network at 1.14 Terabits–per–Second", B.r. Hemenway, et al. Optical Fiber Communication Conference, 1997.

"Management of WDM Optical Networks", Mari W. Maeda, Bellcore, OFC '97 Tutorial, pp. 141–166.

IEEE Network, May/Jun. 1997, vol. 11 No. 3, Two Articles—Guest Editorial—Network and Internet Security, Tom Chen, p. 11, and Security Issues in All–Optical Networks, Muriel Médard, et al., pp. 42–48.

"Automatic Fault Detection, Isolation, and Recovery in Transparent All–Optical networks", Chung–Sheng Li, Journal of Lightwave Technology, vol. 15, No. 10, Oct. 1997, pp. 1784–1793.

"Guaranteed Loopback Recovery over Arbitrary Redundant Graphs", Muriel Nédard, et al., Jul. 15, 1997, pp. 1–21.

"The Issue of Attack Detection in All–Optical Networks", Muriel Médard, et al., Jul. 29, 1997, pp. 1–17.

"Automatic protection switching for multicasting in optical mesh networks", Muriel Médard, et al., OFC '97 Tech. Digest, pp. 314–315.

* cited by examiner

FAULT ISOLATION FOR COMMUNICATION NETWORKS FOR ISOLATING THE SOURCE OF FAULTS COMPRISING ATTACKS, FAILURES, AND OTHER NETWORK PROPAGATING ERRORS

GOVERNMENT RIGHTS

This invention was made with government support under Contract No. F19628-95C-0002 awarded by the Department of the Air Force. The Government has certain rights in this invention.

RELATED APPLICATIONS

Not applicable.

FIELD OF THE INVENTION

This invention relates generally to communication networks and more particularly to localizing attacks or failures in communications networks.

BACKGROUND OF THE INVENTION

As is known in the art, there is a trend to provide communication networks which operate with increasing information capacity. This trend has led to the use of transmission media and components capable of providing information over relatively large signal bandwidths. One type of transmission media capable of providing such bandwidths is an optical carrier transmission media such as glass fibers which are also referred to as optical fibers or more simply fibers.

As is also known, an all-optical network (AON) refers to a network which does not contain electronic processing components. AONs utilize all-optical switching components which afford network functionality and all-optical amplification components which counteract attenuation of the optical signals through the network. Since AONs do not contain electronic processing components, AONs avoid network bottlenecks caused by such electronic processing elements.

Because AONs support delivery of large amounts of information, there is a trend to utilize AONs in those network applications which require communications rates in the range of 1 terabit per second and greater. While network architectures and implementations of AONs vary, substantially all of the architectures and implementations utilize devices or components such as optical switches, couplers, filters, attenuators, circulators and amplifiers. These building block devices are coupled together in particular ways to provide the AONs having particular characteristics.

The devices which perform switching and amplification of optical signals have certain drawbacks. In particular, owing imperfections and necessary physical tolerances associated with fabricating practical components, the components allow so-called "leakage signals" to propagate between signals ports and signal paths of the devices. Ideal device signal paths are ideally isolated from each other. Such leakage signals are often referred to as "crosstalk signals" and components which exhibit such leakage characteristics, are said to have a "crosstalk" characteristic.

The limitations in the isolation due to the physical properties of switches and amplifiers can be exploited by a nefarious user. In particular, a nefarious user on one signal channel can affect or attack other signal channels having signal paths or routes which share devices with the nefarious user's channel. Since signals flow unchecked through the AON, the nefarious user may use a legitimate means of accessing the network to effect a service disruption attack, causing a quality of service degradation or outright service denial. The limitations in the operating characteristics of optical components in AONs thus have important security ramifications.

One important security issue for optical networks is that service disruption attacks can propagate through a network. Propagation of attacks results in the occurrence of failures in portions of the network beyond where the attack originated. This is in contrast to failure due to component fatigue. Failures due to component fatigue generally will not propagate through the network but will affect a limited number of nodes and components in the network. Since the mechanisms and consequences of a service disruption attack are different from those of a failure, it is necessary to provide different responses to attacks and failures. Thus, it is important to have the ability to differentiate between a failure and an attack and to have the ability to locate the source of an attack.

Referring to FIG. 1, an example of an attack which propagates through a switch 10 and an amplifier 16 is shown. The switch 10 includes switch ports 10a–10d with a first switch channel 12a provided between switch ports 10a and 10c and a second switch channel 12b provided between switch ports 10b and 10d. The switch 10 has a finite amount of isolation between the first and second switch channels 12a, 12b. Owing to the finite isolation characteristics of the switch 10, a portion of a signal propagating along the first switch channel 12a can be coupled to the second switch channel 12b through a so-called "leakage" or "crosstalk" signal path or channel 14. Thus, a crosstalk signal 15 propagates from the first switch channel 12a through the crosstalk channel 14 to the second switch channel 12b.

The output of the second switch channel 12b is coupled through switch port 10d to an input port 16a of a two-channel amplifier 16. The amplifier receives a second channel 12c at a second amplifier input port 16b. If the crosstalk signal 15 on channel 12b is provided having a particularly high signal level, the crosstalk signal 15 propagating in channel 12b of the amplifier 16 couples power from the signal propagating on the second amplifier channel 12c thereby reducing the signal level of the signal propagating on the channel 12c. This is referred to as a gain competition attack. It should thus be noted that a signal propagating on the first channel 12a can be used to affect the third channel 12c, even though the channels 12a and 12c are routed through distinct components (i.e. channel 12a is routed through the switch 10 and channel 12c is routed through the amplifier 16).

It should also be noted that in this particular example, the gain competition attack was executed via a signal inserted into the channel 12b via the crosstalk channel 14 existent in the switch 10. Thus, a user with a particularly strong signal can couple power from the signals of other uses without directly accessing an amplifier component. With this technique, a nefarious user can disrupt several users who share amplifiers which receive a gain competition signal from the nefarious user via a different component propagating on the channel 12c.

FIG. 2 illustrates one scenario for the necessity to differentiate an attack carried out by the network traffic from a physical failure and when it is important to be able to localize the source of the attack. In FIG. 2, a portion of a network includes a first network node 17a provided by a first element which here corresponds to a switch 10 and a second network node 17b provided by a second element which here corresponds to a second switch 18. It should be noted that the nodes 17a, 17b are here shown as switches for purposes of illustration only and that in other embodiments, the nodes 17a, 17b may be provided from elements other than switches. In this example, it is assumed that each of the nodes 17a, 17b guards against jamming attacks by pinpointing any channel on which is propagating a signal having a signal level higher than a predetermined threshold level and then disconnecting the channel on which the high level signal propagates.

In FIG. 2, the switch 10 includes switch ports 10a–10d with a first switch channel 12a provided between switch ports 10a and 10c and a second switch channel 12b provided between switch ports 10b and 10d. The switch 10 has a finite amount of isolation between the first and second switch channels 12a, 12b. Channels 12a, 12b both propagate through the node 17a, which in this particular example corresponds to the switch 10a, and both channels 12a, 12b propagate signals having the same carrier signal wavelength. Owing to the finite isolation characteristics between channels 12a, 12b in the switch 10, a portion of a signal propagating along the first switch channel 12a can be coupled to the second switch channel 12b through a crosstalk channel 14. Thus, the crosstalk signal 15 propagates from the first switch channel 12a through the crosstalk channel 14 to the second switch channel 12b.

If an excessively powerful signal (e.g. one having a signal level equal to or greater than the predetermined threshold level) is introduced via switch port 10a onto channel 12a, then channel 12a will be disconnected. The crosstalk signal 15, however, from channel 12a is superimposed upon channel 12b at node 17a. If the carrier signals on the two channels 12a, 12b have substantially the same wavelength, the signal levels of the two carrier signals may add. Thus, the signal propagating in channel 12b, in turn, may exceed the predetermined threshold signal level.

The crosstalk signal 15 and the carrier signal propagating on channel 12b are coupled to the second switch 18 which is provided having first and second channels 12b, 12c. Switch 18, like switch 10 has a finite amount of isolation between the first and second switch channels 12b, 12c. Channels 12b, 12c both propagate through the same node 17b, which in this particular example corresponds to the switch 18. Furthermore, signals propagating on the channels 12b, 12c have substantially the same carrier signal wavelength. Owing to the finite isolation characteristic of the switch 18, a portion of the signal propagating along the channel 12b can be coupled to the second switch channel 12c through a crosstalk channel 20. Thus, the crosstalk signal 15 propagates from the first switch channel 12b through the crosstalk channel 20 to the second switch channel 12b resulting in a second crosstalk signal 21 propagating on the channel 12c.

Since the carrier signals propagating in channels 12a, 12b and 12c each have substantially the same wavelength, if the amplitude of the crosstalk signal is sufficiently large, disruption of the signals propagating on the channel 12c can occur.

In this case both nodes 17a, 17b may correctly recognize the failure as a crosstalk jamming attack. Node 17a will correctly ascertain that the offending channel is channel 12a but node 17b will ascertain the offending channel as channel 12b. If the network has no means of localizing the source of the attack, then node 17a will disconnect channel 12a and node 17b will disconnect channel 12b. Channel 12b will, therefore, have been erroneously disconnected. Thus, to allow the network to properly recover from attacks, it is necessary to ascertain attacks carried out by network traffic and to localize the source of these attacks.

In networks having relatively high data transmission rates, ultrafast restoration is typically preplanned and based upon local information (i.e. information local to a network node). The restoration route is generally stored in a memory device within the network nodes. This approach avoids the delays associated with dynamically computing routes once a failure occurs. To utilize such a pre-planned or pre-stored approach, it is thus necessary to store the alternate route information at each of the network nodes.

As explained above in conjunction with FIG. 2, the techniques for responding to signal transmission problems due to a failure which occurs because of natural fatigue of components or physical sabotage of the network are not well suited to responding to signal transmission problems caused by the signals themselves. For example, one technique for recovering from a node failure (i.e. a failure due to natural fatigue of components or physical sabotage of the network) is to reroute traffic away from the failed node. This technique is used in synchronous optical networks (SONET) and synchronous digital hierarchy (SDH) bidirectional self-healing rings (SHRS). In a SONET/SDH bidirectional SHR, if the traffic itself is the cause of the failure, as is the case in the amplifier and switch attacks discussed above, then failures may be caused throughout the network without any restoration.

Another technique for recovering from a failure is to localize component failures. Once the failed components are localized, they can be physically removed from the network and repaired or replaced with other components. One problem with this technique, however, is that it results in service degradation or denial while the failed component or components are being identified and repaired or replaced. Another problem with this technique is that it may take a relatively long period of time before the failed component or components can be identified and repaired or replaced. Furthermore, since each failed component must be physically located and repaired or replaced, further time delays can be incurred.

Thus, if techniques intended to respond to naturally occurring failures are applied to cases of service disruption attacks in AONs, an attack at a single point can lead to widespread failures within the network. It is, therefore, important to be able to ascertain whether an attack is caused by traffic itself or from a failure which occurs because of natural fatigue of components or physical sabotage of the network.

For example, assume there is an attack on a node i, which carries channels 1, 2 and 3, from channel 1. If a network management system deals with all failures as though they were benign failures (e.g. a failure due to component fatigue), then the network management system assumes that node i failed of its own accord and reroutes the three channels to some other node, say node j. After that rerouting, node j will appear as having failed because channel 2 will attack node j. The network may then reroute all three channels to node k, and so on. Therefore, it is important for node i under attack to be able to recognize an attack coming from its traffic stream and to differentiate it from a physical hardware failure which is not due to the traffic streams traversing node i.

Attacks such as the amplifier and switch attacks discussed above can lead to service denial. The ability to use attacks to deny service stems from the fact that attacks can spread, causing malfunctions at several locations, whereas failures generally do not disrupt the operation of several devices. Thus, while a single network element failure may cause several network elements to have corrupted inputs and outputs, the failure will not generally cause other network elements to be defective in their operation.

SUMMARY OF THE INVENTION

In view of the above, it has been recognized that since the results of component failures and attacks are often similar (e.g. improper operation of one or more network components or nodes), the difference is transparent to a network node or system user. Because of this transparency there is no absolute metric to determine whether an input is faulty or not. Instead, it is necessary to examine the operation of a node, i.e., the relation between the input and the output. A failure will lead to incorrect operation of the node. An attack, as illustrated above in conjunction with FIGS. 1 and 2, can cause network elements not only to have corrupted inputs and outputs, but the nature of those corrupted inputs can lead to improper operation of the network elements themselves. Hence, if alarms are raised at individual network elements by improper operation of the network element, a fault will lead to a single alarm. An attack, on the other hand, may lead to alarms in several nodes downstream (in the flow of communications) of the first node or network point which is attacked. Thus, if a restoration scheme is prepared to recover from failures but encounters instead an attack, the restoration scheme itself may malfunction and cause failures.

FIGS. 3, 3A illustrate SONET/SDH approaches to recovery schemes. These recovery schemes are based on rings. SONET/SDH, allow for network restoration after failure using two techniques illustrated respectively in FIGS. 3 and 3A.

Referring now to FIG. 3 a ring 24 having network nodes 24a–24e utilizes a recovery technique typically referred to as automatic protection switching (APS). The APS technique utilizes two streams 26a, 26b which traverse physically node or link disjoint paths between a source and a destination. In this particular example, stream 26a couples a source node 24a to a destination node 24d with information flowing in a clockwise direction through intermediate nodes 24b, 24c. Stream 26b, on the other hand, couples the source node 24a to destination node 24d with information flowing in a counterclockwise direction through intermediate node 24e. In case of failure of a node or link along one of the streams, e.g. stream 26a, the receiving node listens to the redundant, backup, stream e.g. stream 26b. Such a technique is used in the SONET unidirectional path switched ring (UPSR) systems.

Referring now to FIG. 3A a ring 28 having network nodes 28a–28e utilizes a recovery technique typically referred to as loopback protection. In the loopback approach, in case of a failure, a single stream 29a is rerouted onto a backup channel 29b. Such an approach is used in the SONET bidirectional line switched ring (BLSR).

For any node or edge redundant graph, there exists a pair of node or edge-disjoint paths, that can be used for APS, between any two nodes. Automatic protection switching over arbitrary redundant networks need not restrict itself to two paths between every pair of nodes, but can instead be performed with trees, which are more bandwidth efficient for multicast traffic. For loopback protection, most of the schemes have relied on interconnection of rings or on finding ring covers in networks. Loopback can also be performed on arbitrary redundant networks.

FIGS. 4 and 4A, in which like elements are provided having like reference designations, the manner in which a single attack may lead to service disruption in the case of loopback recovery is shown.

Referring briefly to FIG. 4 a portion of a network 30 includes network nodes j, k. For purposes of illustration, assume node j is the attack source (i.e. node j is attacked, for instance by a nefarious user using node j as a point of entry into the network for insertion of a spurious jamming signal).

The jamming signal causes the nodes adjacent to node j to infer that node j has failed, or is "down." The same jamming signal, upon traveling to node k, will cause the nodes adjacent to node k to infer that node k has failed. If both nodes j and k are considered as individual failures by a network management system, then loopback will be performed to bypass both nodes j and k in a ring. Thus, all traffic which passed through both nodes j and k will be disrupted, as indicated by path 31 in FIG. 4 by the loopback at each of the nodes j, k.

Referring now to FIG. 4A, if node j is correctly localized as the source of the attack, then loopback effected to bypass node j will lead to correct operation of the network, with only the inevitable loss of traffic which had node j as its destination or origination. Traffic which traversed node j from node i is backhauled through node j. Thus, by correctly localizing the source of an attack, the amount of traffic which is lost can be reduced.

Briefly, and in general overview, work in the area of fault localization in current data networks can be summarized and categorized as three different sets of fault diagnosis frameworks: (1) fault diagnosis for computing networks; (2) probabilistic fault diagnosis by alarm correlation; and (3) fault diagnosis methods specific to AONs.

The fault diagnosis framework for computing networks covers those cases in which units communicate with subsets of other units for testing. In this approach, each unit is permanently either faulty or operational. The test on a unit to determine whether it is faulty or operational is reliable only for operational units. Necessary and sufficient conditions for the testing structure for establishing each unit as faulty or operational as long as the total number of faulty elements is under some bound are known in the art. Polynomial-time algorithms for identifying faults in diagnosable systems have been used. Instead of being able to determine exactly the faulty units, another approach has been to determine the most likely fault set.

All of the above techniques have several drawbacks. First, they require each unit to be fixed as either faulty or operational. Hence, sporadic attacks which may only temporarily disable a unit cannot be handled by the above approaches. Thus, the techniques are not robust. Second, the techniques require tests to be carefully designed and sequentially applied. Moreover, the number of tests required rises with the possible number of faults. Thus, it is relatively difficult to scale the techniques. Third, the tests do not establish any type of causality among failures and thus the tests cannot establish the source of an attack by observing other attacks. The techniques, therefore, do not allow network nodes to operate with only local information. Fourth, fault diagnosis by many successive test experiments may not be rapid enough to perform automatic recovery.

The probabilistic fault diagnosis approaches for performing fault localization in networks typically utilize a Bayesian analysis of alarms in networks. In this approach, alarms from different network nodes are collected centrally and analyzed to determine the most probable failure scenario.

Unlike the fault diagnosis for computing networks techniques, the Bayesian analysis techniques can be used to discover the source(s) of attacks thus enabling automatic recovery. Moreover, the Bayesian analysis techniques can analyze a wide range of time-varying attacks and thus these techniques are relatively robust. All of the above results, however, assume some degree of centralized processing of alarms, usually at the network and subnetwork level. Thus, one problem with this technique is that an increase in the size of the network leads to a concomitant increase in the time and complexity of the processing required to perform fault localization.

Another problem with the Bayesian analysis techniques is that there are delays involved with propagation of the messages to the processing locations. In networks having a relatively small number of processing locations, the delays are relatively small. In network's having a relatively large number of processing locations, however, the delays may be relatively long and thus the Bayesian analysis techniques may be relatively slow. Thus the Bayesian analysis techniques may not scale well as network data rates increase or as the size of the network increases. If either the data rate or the span of network increase, there is a growth in the latency of the network, i.e. the number of bits in flight in the network. The combined increase in processing delay and in latency implies that many bits may be beyond the reach of corrective measures by the time attacks are detected. Therefore, an increase in network span and data rate would lead to an exacerbation of the problem of insufficiently rapid detection.

For AONs, fault diagnosis and related network management issues have been considered. Some of the management issues for other high-speed electro-optic networks are also applicable. The problem of spreading of fault alarms, which exists for several types of communication networks, is exacerbated in AONs by the fact that signals flow through AONs without being processed. To address faults only due to fiber failure, only the nodes adjacent to the failed fiber need to find out about the failure and a node need only switch from one fiber to another. For failures which occur in a chain of in-line repeaters which do not have the capability to switch from one fiber to another, one approach is when a failure occurs, the alarm due to the failure is generated by the in-line repeater immediately after the link failure. The failure alarm then travels down to a node which can perform failure diagnostic. The failure alarms generated downstream of the first failure are masked by using upstream precedence. Failure localization can then be accomplished by having the node capable of diagnostics send messages over a supervisory channel towards the source of the failure until the failure is localized and an alarm is generated at the first repeater after a failure. These techniques require diagnostic operations to be performed by remote nodes and to have two-way communications between nodes.

It would, therefore, be desirable to provide a technique for stopping an attack on a signal channel by a nefarious user which does not result in service degradation or denial. It would also be desirable to provide a technique for localizing an attack on a network. It would further be desirable to provide a relatively robust, scalable technique which localizes rapidly the source of an attack in a network and allows rapid, automatic recovery in the network.

In accordance with the present invention, a distributed method for performing attack localization in a network having a plurality of nodes includes the steps of (a) determining, at each of the plurality of nodes in the network, if there is an attack on the node; (b) transmitting one or more messages using local communication between first and second nodes wherein a first one of the nodes is upstream from a second one of the nodes and wherein each of the one or more messages indicates that the node transmitting the message detected an attack at the message transmitting node; and (c) processing messages received in a message processing one of the first and second nodes to determine if the message processing node is first node to sustain an attack on a certain channel. With this particular arrangement, a technique for finding the origin of an attacking signal is provided. By processing node status information at each node in the network and generating responses based on the node status information and the messages received by the node, the technique can be used to determine whether an attack is caused by network traffic or by failure of a network element or component. In this manner, an attack on the network can be localized. By localizing the attack, the network maintains quality of service. Furthermore, while the technique of the present invention is particularly useful for localization of propagating attacks, the technique will also localize component failures which can be viewed as non-propagating attacks. The technique can be applied to perform loopback restoration as well as automatic protection switching (APS). Thus, a technique provides a means for utilizing attack localization with a loopback recovery technique or an APS technique to avoid unnecessary service denial. The nodes include a response processor which processes incoming messages and local node status information to determine the response of the node. The particular response of each node depends upon a variety of factors including but not limited to the particular type of network, the particular type of recovery scheme (e.g. loopback or automatic protection switching), the particular type of network application and the particular goal (e.g. raise an alarm, reroute the node immediately before and/or after the attacked node in the network, etc . . . ).

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Terminology

Figure 1:
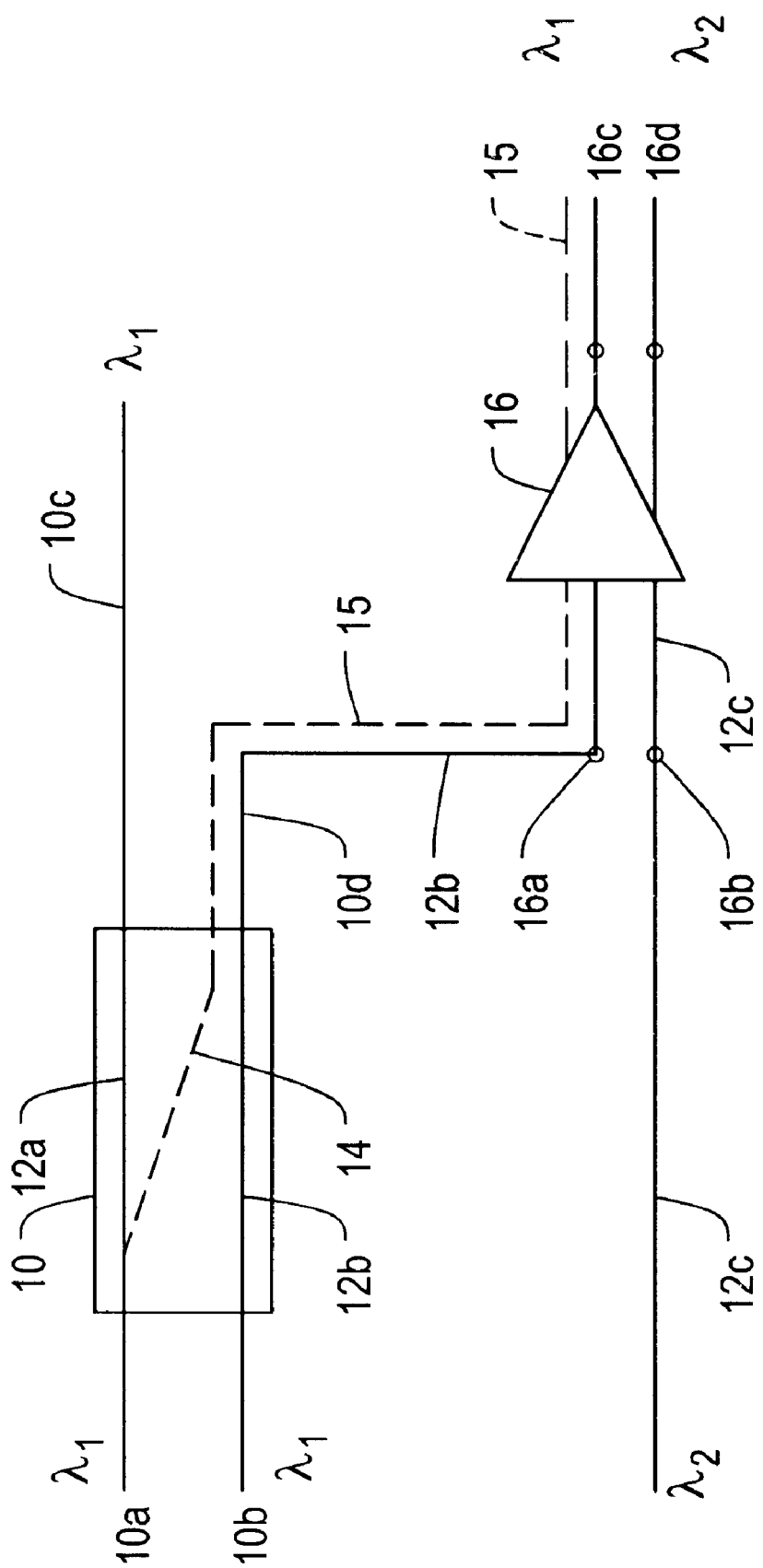
FIG. 1 is a block diagram illustrating a network attack implemented through a switch and an amplifier.
Figure 2:
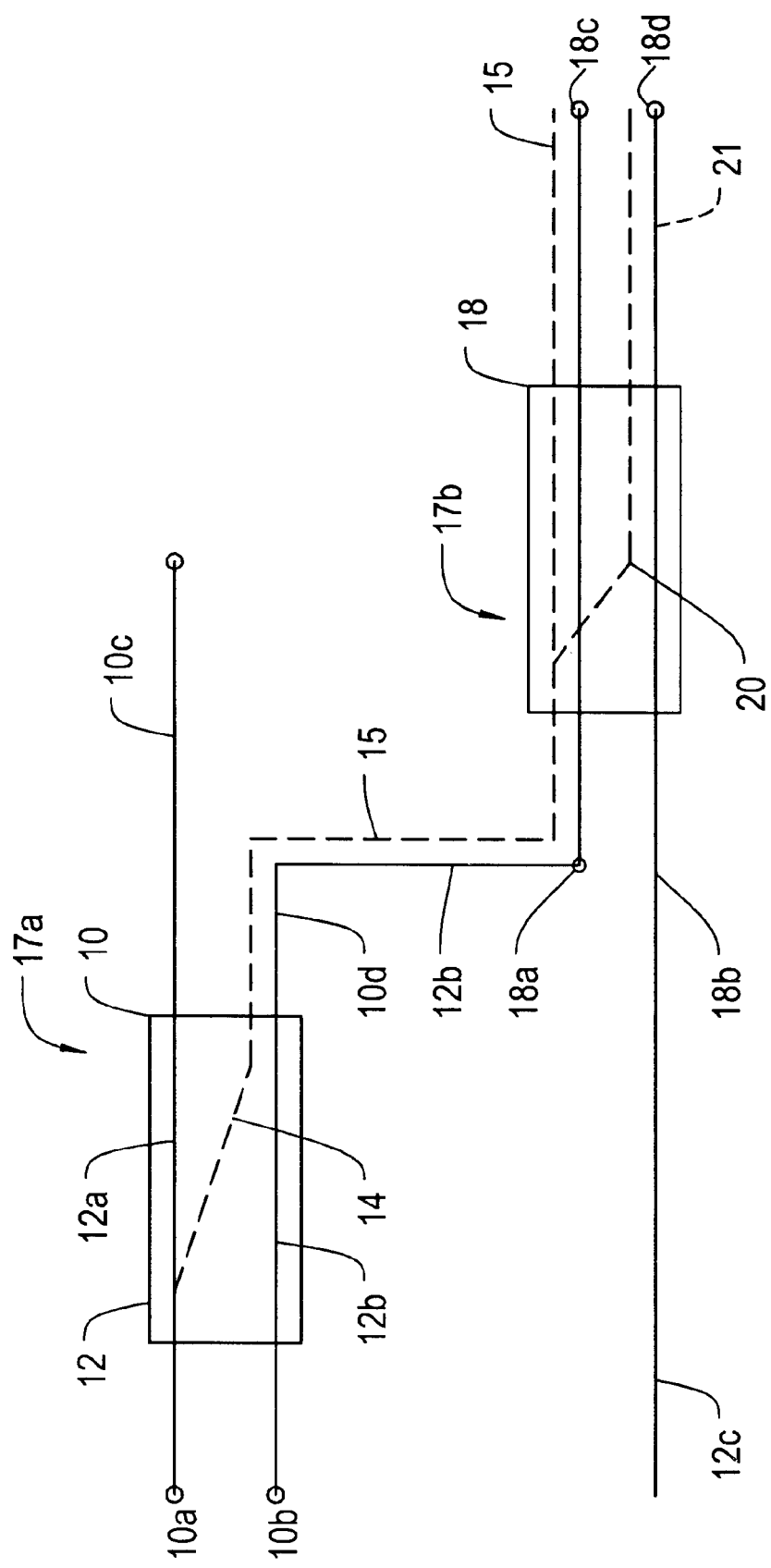
FIG. 2 is a block diagram illustrating a network attack implemented through a pair of switches.
Figure 3:
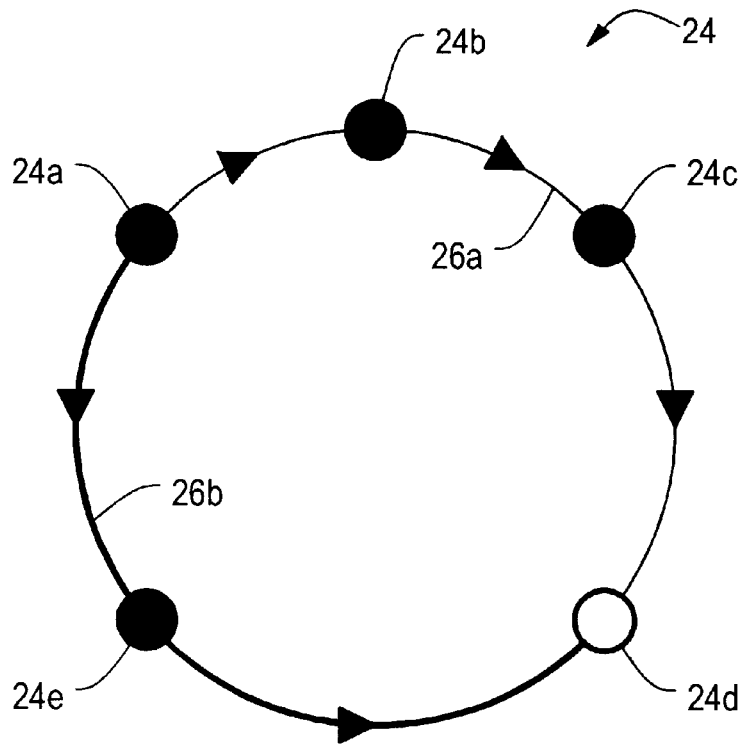
FIG. 3 is a block diagram illustrating the results of an automatic protection switching technique in a ring network.
Figure 3A:
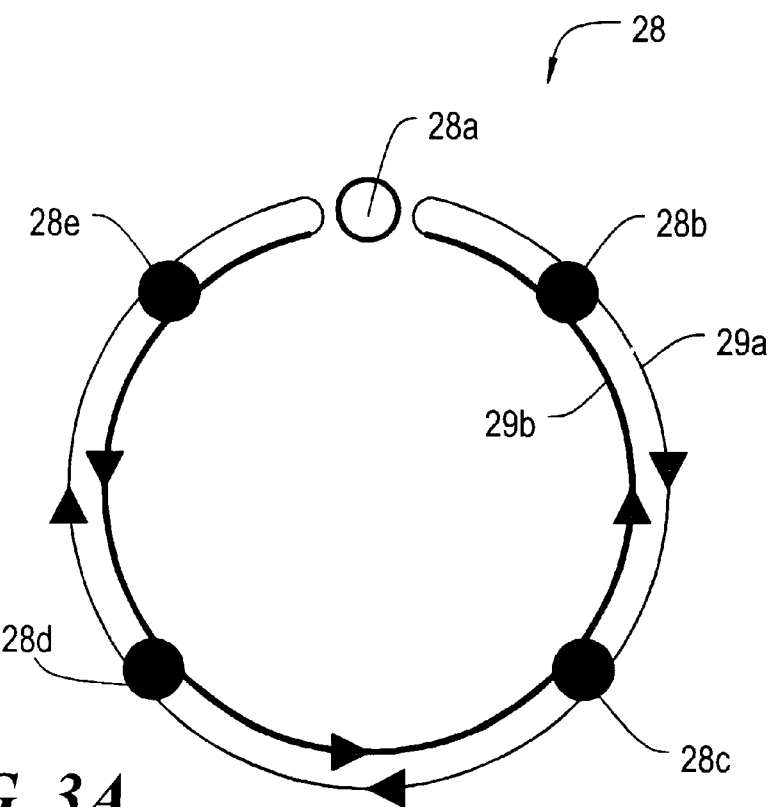
FIG. 3A is a block diagram illustrating the results of a loopback protection technique in a ring network.
Figure 4:
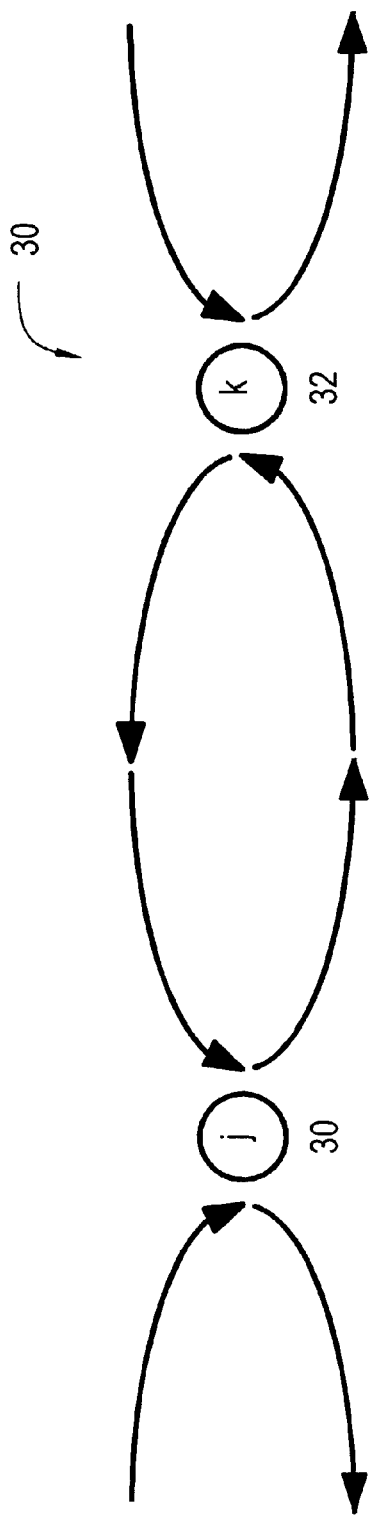
FIG. 4 is a block diagram illustrating a first possible result of loopback recovery when a pair of nodes detect an attack and both nodes are believed to be faulty.
Figure 4A:
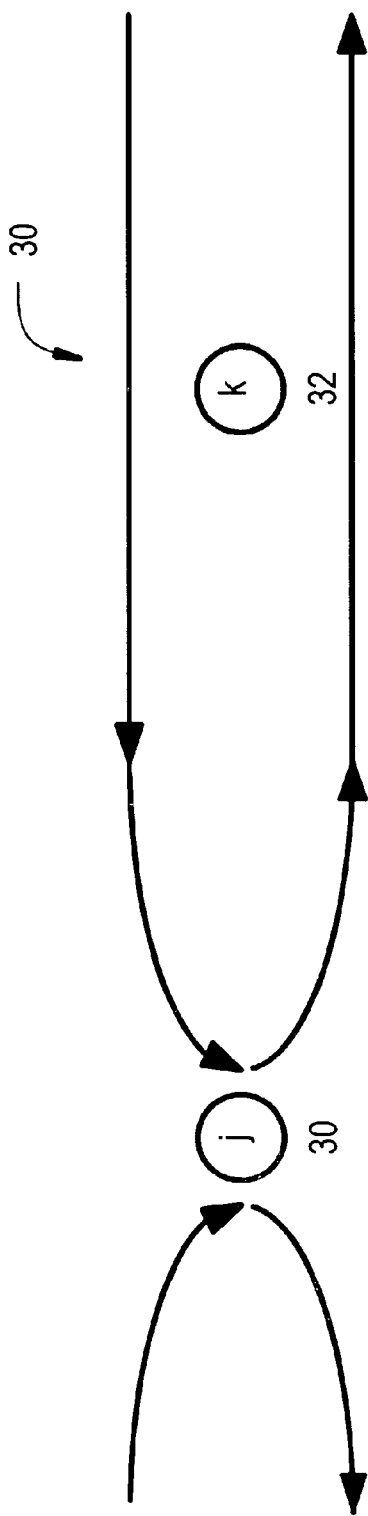
FIG. 4A is a is a block diagram illustrating a second possible result of loopback recovery when a pair of nodes detect an attack and the attack source is localized.

Before describing the apparatus and processes for performing fault isolation in communication networks, some introductory concepts and terminology are explained. The term "network" as used herein refers to a collection of assets, switching apparatus and conduits which permit the transmission of resources. Thus, the networks may be used for communications systems, data transmission systems, information systems or power systems. In one embodiment, the network may be provided as an internet. The resources may be provided as optical signals such as power signals, information signals, etc. . . .

The term "node" refers to a component or group of components or a processing element or a combination or group of processing elements in a network. A source node refers to a point of origin of a message and a destination node refers to an intended point of receipt of a message. A first node in a series of nodes affected by an attack is referred to as the "source of the attack", or an "attack source" even though the attack may have been launched at a different point in the network.

A "channel" refers to a combination of transmission media and equipment capable of receiving signals at one point and delivering the same or related signals to another point. A "message", refers to information exchanged between nodes in a network. Thus messages are transmitted between nodes on channels.

The term "failure" refers to any malfunction which (a) affects the input-to-output relationship at a node of a network; or (b) leads or to imperfect or incorrect operation of a network, network transmission media or a network node (e.g. a malfunction or degradation of a node or a link due to natural fatigue of components or physical sabotage of the network).

The term "attack" refers to a process which causes a failure at one or more links or nodes. An attack is a process which affects signal channels having signal paths or routes which share devices with a nefarious user's channel.

The term "fault" refers to a component failure of a network element. Typically, the term "fault" is used to describe a hardware failure in a network and in particular a hardware failure of a network element.

The term "attack localization" or more simply "localization" refers to the process by which the source of an attack in the network is isolated. The same process can also pinpoint other nodes in the network which may experience a failure due to an attack but which are not the source of an attack.

It should be noted that the techniques of the present invention have applicability to a wide variety of different types of networks and is advantageously used in those applications which provide relatively high-speed optical communications. For example, the techniques may be used in all optical networks (AONs) or for SONET and SDH networks which each include network restoration protocols. It should be noted that although SONET/SDH are not all-optical standards, the rates supported by these standards make their need for rapid service restoration commensurate with that of AONs. Thus, the techniques described herein find applicability in any network having a need for rapid service restoration.

Figure 5:
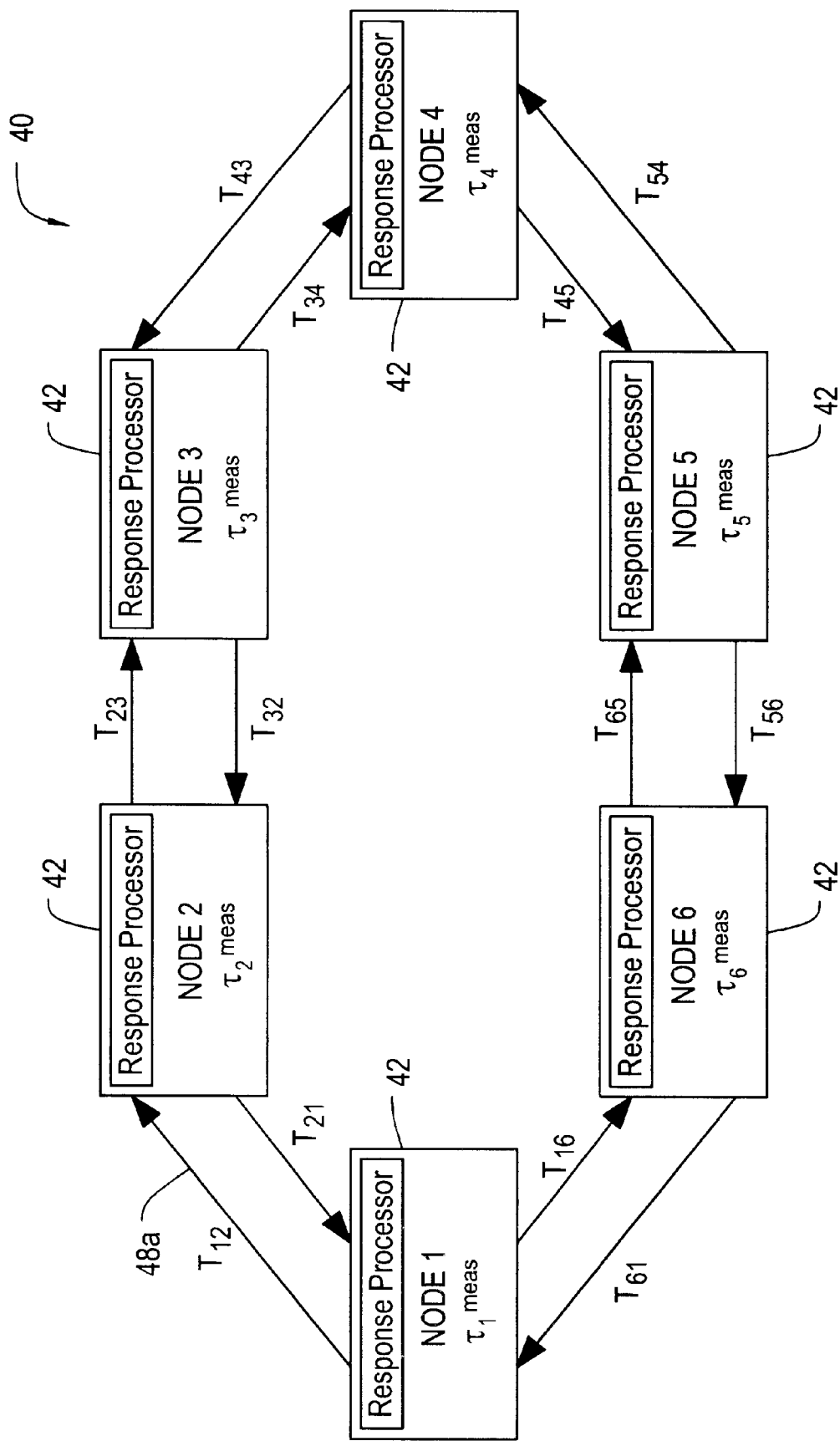
FIG. 5 is a block diagram of a network.

Referring now to FIG. 5, a network 40 includes a plurality of nodes N1–N6, generally denoted 42. Each of the nodes 42 processes a predetermined number of communication channels (e.g., channel 48a) coupled thereto via respective ones of communication links 48. Each of the nodes 42 includes a response processor 43 which processes incoming messages to the node (InMessages) and local node status information to determine the response of the node 42 which receives the incoming messages. Each of the channels may terminate or originate at certain nodes 42 and each channel has a specific direction (i.e. signals are transmitted in a particular direction in each communication channel). Thus, with respect to a particular channel, nodes can be referred to as being upstream or downstream of one another.

For example, in one communication channel the node N1 is upstream of the node N2 and the node N1 is downstream of the node N6. In another communication channel, however, the node N1 may be downstream of the node N2 and the node N1 may be upstream of the node N6. Each node N2 is able to detect and recognize attacks being levied against it, receive and process messages arriving to it and generate and transmit messages to nodes which are upstream or downstream of it on certain channels.

It should be noted that for the purposes of the present invention, a node may correspond to a single network component. Alternatively a single network component may be represented as more than one node. For example, a switch may be represented as several nodes, one node for each switching plane of the switch. Likewise, in some applications it may be advantageous to represent a multichannel amplifier as a single node while in other applications it may be advantageous to represent the multichannel amplifier as multiple nodes. Alternatively still, a cascade of in-line amplifiers may be modeled as a single node because they have a single input and a single output.

After reading the techniques described herein, those of ordinary skill in the art will appreciate how to advantageously represent particular network components and when to represent multiple components as a single node and when to represent a single component as a network node. In making such a determination, a variety of factors are considered including but not limited to the ability of a node or network element or component to detect a failure (e.g. it may be preferable to not represent an element as a node if the element can't detect a failure) and the importance in any particular application of having the ability to specifically localize a network element (e.g. in some applications it may be desirable to localize an attack to a node which includes many elements while in other applications it may be desirable or required to localize an attack to a particular element within a node). This depends, at least in part, on where the processing capability exists within a network. Depending upon the particular application, other factors may also be considered.

Each of the nodes 42 has one or more inputs $I_{ij}$ and outputs $O_{ij}$ with corresponding directed connections denoted as (i, j) when the connection is made from node i to node j by a link. An undirected connection between nodes i and j is denoted herein as [i, j]. In FIG. 5, node inputs and outputs are designated 49 and for simplicity and ease of description each of the nodes 42 include a single input and a single output generally denoted 48. The notation $T_{12}$ indicates the time required to transmit a message on a channel between nodes 1 and 2 on which channel information flows in a direction from node 1 to node 2. Those of ordinary skill in the art will appreciate, of course, that in practical networks many of the nodes will have multiple inputs and outputs.

Network 40 and the networks referred to and described herein below are assumed to be acyclic (i.e. the particular communication path along which the information is transmitted contains no cycles).

In general overview, the network 40 operates in accordance with the present invention in the following manner. A distributed processing occurs in the nodes 42 to provide a technique which can rapidly ascertain the one or ones of the nodes 42 are sources of an attack. It should be noted that the nodes 42 include some processing capability including means for detection of failures. The ability to provide the nodes with such processing capability is within the skill of one of ordinary skill in the art. Thus, the nodes 42 can detect failures with satisfactory false positive and false negative probabilities. The ability to localize attacks in the network is provided in combination by the distributed processing which takes place in the network.

The techniques of the present invention for attack localization are, therefore, distributed and use local communication between nodes up- and down-stream. Each node 42 in the network 40 determines if it detects an attack. It then processes messages from neighboring nodes 42 to determine if the attack was passed to it or if it is the first node to sustain an attack on a certain channel. The first node affected by an attack is referred to as the source of the attack, even though the attack may have been launched elsewhere. The global success of localizing the attack depends upon correct message passing and processing at the local nodes.

In describing the processing which take place at particular nodes, it is useful to define some terms related to the timing of such processing. Time delays for processing and transmission of messages at each of the nodes 42 are denoted as follows:

$T_i^{meas}$=measurement time for node i including time to format and send messages (where the measurement time is the time required to detect an attack);

$T_i^{proc}$=processing time for nodes i including time to format and send messages (where the processing time is the time required to process received messages); and $T_{ij}$=time to transmit a message from node i to node j on arc (i, j).

In some instances described herein below, the time delays at all nodes are identical and thus the measurement and processing times are denoted as $T^{meas}$ and $T^{proc}$ without subscripts.

One concept included in the present invention is the recognition that, in order for a node to determine whether or not it is the source of an attack, it need only know whether a node upstream of it also had the same type of attack. For example, suppose that node 1 is upstream of node 2 on a certain channel 48a which is ascertained as being an attacking channel and that both node 1 and node 2 ascertain that the attacking channel is channel 48a. Suppose further that both nodes 1 and 2 have processing times $T^{meas}$ and $T^{proc}$. If node 1 transmits to node 2 its finding that the channel 48a is nefarious, then the interval between the time when the attack hits node 2 land node 2 receives notice from node 1 that the attack also hit node 1 is at most $T^{meas}$, since the attack and the message concerning the attack travel together.

Moreover, the detection the attack commences at node 2 as soon as the attack hits. Hence, the elapsed time from when the attack hits node 2 detects the attack and determines whether node 1 also saw that attack is $T^{meas}+T^{proc}$. It should be noted that this time is independent of the delay in the communications between nodes 1 and 2 because the attack and the message concerning the attack travel together, separated by a fixed delay. If the attack hits several nodes, each node only waits time $T^{meas}+T^{proc}$ to determine whether or not it is the first node to detect that attack, i.e. whether it is the source of the attack.

To illustrate the technique, it is useful to consider a relatively simple attack localization problem. In this network nodes can either have a status of 1 (O.K.) or 0 (alarm). Nodes monitor messages received from nodes upstream. Let the message be the status of the node. When an attack occurs in this network, the goal of the techniques set forth in accordance with the present invention is that the node under attack respond with an alarm and all other nodes respond with O.K.

During the processing, once an attack is detected at a node, node 2 in network 40 for example, node 2 initiates processing to ascertain the source of the attack by transmitting its own node status to other nodes and receiving the status of other nodes via messages transmitted to node 2 from the other nodes. It should be noted that the nodes from which node 2 receives messages may be either upstream or downstream nodes. In response to each of the messages received by node 2 which meet a predetermined criteria (e.g. the messages are received at node 2 within a predetermined period of time such as $[t-T^{WAIT1}, t+T^{WAIT2}]$ node 2 transmits response messages which provide information related to the identity of the attack source. It should be noted that in some embodiments the response can be 40 ignore messages. Similarly, each of the nodes 42 in network to receive messages and in response to particular ones of the messages, the nodes provide information related to the identity of the source of the attack. The particular response messages will vary in accordance with a variety of factors including but not limited to the particular network application and side effects such as, loopback, re-routing and disabling of messages.

In performing such processing, each of the nodes 42 receives and stores information related to the other nodes in the network 40. Thus, the processing to localize the attack source is distributed throughout the network 42.

With the above distributed approach, if node 2 is downstream from node 1 and node 2 detects a crosstalk jamming attack on the first channel and node 2 has information indicating that the node 1 also had a crosstalk jamming attack on a second different channel, node 2 can allow node 1 to disconnect the channel subject to the attack. Once node 1 disconnects the channel subject to the attack, the channel subject to the attack at node 2 ceases to appear as an offending channel at node 2.

If node 2 did not have information from node 1 indicating that the channel at node 1 was subject to attack at node 1 then node 2 infers that the attacker is attacking node 2 on the channel on which it detected the attack. Node 2 then disconnects the channel. It should be appreciated that node 2 sees no difference between the cases where channel 1 is the attacker at node 1 and where channel 2 is the attacker at node 2. In both cases, channel 2 appears as the attacker at node 2. Thus, by using knowledge from the operation of node 1 upstream of node 2, node 2 can deduce whether the attack originated with channel 1 or channel 2 thereby avoiding the result of erroneously disconnecting a channel which is not the source of an attack. Thus, the technique of the present invention allows the network to recover properly from attacks by identifying attacks carried out by network traffic and localizing those attacks.

As mentioned above, each of the nodes 42 can detect an attack or fault within acceptable error levels. The type of faults detected are included in a set of fault types denoted F stored within a node storage device. One of the fault types in F is always a status corresponding to a no fault status meaning that the node has not detected a fault.

The status of a node at a time t is denoted:

$$S_t(i) \epsilon F$$

in which:

S(i) is the current status of node i;

t is the time to which the current node status applies; and

F is the set of all faults to which the status must belong (i.e. the current node status must be a status included in the set of faults F)

Considering a connection between the nodes i and j along the arc (i, j), a message from node i to node j at time t is denoted $M_t(\overrightarrow{i,j})$. Messages can be sent upstream or downstream in the network 40. The upstream message from node j to node i at time t is denoted $M_t(\overleftarrow{i,j})$. For particular network applications the information encoded in messages varies but typically includes the node status information. Generally, however, the message can include any information useful for processing. It is, however, generally preferred that messages remain relatively small for fast transmission and processing. That is, each message should have a length for each application there is defined a particular maximum message length. The particular message length in any application is selected in accordance with a variety of factors including but not limited to the type of encoding in message, etc. . . . Moreover, the number and lengths of messages should be independent of network size. This allows the system to be scalable with respect to distance and/or number of nodes. If large messages based on network size are utilized, this results in loss of the scalability characteristic of the invention because of long processing times which would result.

For example, a node can transmit its status upstream and downstream via the messages $M_t(\overrightarrow{i,j})=S_t(i)$ and $M_t(\overleftarrow{i,j})=S_t(j)$. Message $M_t(\overrightarrow{i,j})$ arrives at node j at time $t+T_{ij}$ and likewise message $M_t(\overleftarrow{i,j})$ arrives at node i at time $t+T_{ij}$. Again, the notation $M_t(\overrightarrow{i,j})$ and $M_t(\overleftarrow{i,j})$ indicates the current message from node i to j and node j to node i, respectively.

A response function, R denotes processing of incoming messages and local status information to determine the response of the node which received the incoming message. The response function R will be discussed further below in the context of particular techniques implemented in accordance with the present invention.

In accordance with the invention, it has been recognized that it is necessary to explicitly take into account the time taken by the different processes involved in the identification and localization of attacks. The identification of an attack requires time for detection of the input and output signals and processing of the results of that detection. There is also delay involved in generating messages to upstream and/or downstream nodes. All the time required by all of the above processes executed in sequence is referred to as the processing time at the node. Thus, the processing time at node 1 is denoted as $T_i^{meas}$. Messages from node i to node j take at most time $T_{ij}$ to transmit. Message transmission follows the transmission of the data itself, and does not usually add to the overall time of localizing the attack. Lastly, there are delays due to the time for capturing messages from upstream and/or downstream nodes, the time to process these messages together with local information and the time to generate new messages. We denote the time required by this last set of events as $T_i^{proc}$.

Thus, in accordance with the present invention, a network or network management system provides techniques for: (a) localization of the source of an attack to enable automatic recovery; (b) relatively fast operation (implying near constant operational complexity); (c) scalability—the delay must not increase with the size and span of the network; (d) robustness—valid operation under any attack scenario including sporadic attacks.

FIGS. 6–9, 10, 11, 13 and 13A are a series of flow diagrams which illustrate various aspects of the processing performed by various portions of network 40 to provide a communications network which utilizes a distributed technique for performing fault isolation. The rectangular elements (typified by element 50 in FIG. 6), herein denoted "processing blocks," represent computer software instructions or groups of instructions. The diamond shaped elements (typified by element 54 in FIG. 6), herein denoted "decision blocks," represent computer software instructions, or groups of instructions which affect the execution of the computer software instructions represented by the processing blocks. The flow diagrams do not depict syntax of any particular programming language.

Alternatively, the processing and decision blocks represent steps performed by functionally equivalent circuits such as a digital signal processor circuit or an application specific integrated circuit (ASIC). The flow diagrams do not depict the syntax of any particular programming or design language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown.

It will be appreciated by those of ordinary skill in the art that unless otherwise indicated herein, the particular sequence of steps described is illustrative only and can be varied without departing from the spirit of the invention. That is, unless otherwise noted or obvious from the context, it is not necessary to perform particular steps in the particular order in which they are presented hereinbelow.

Figure 6:
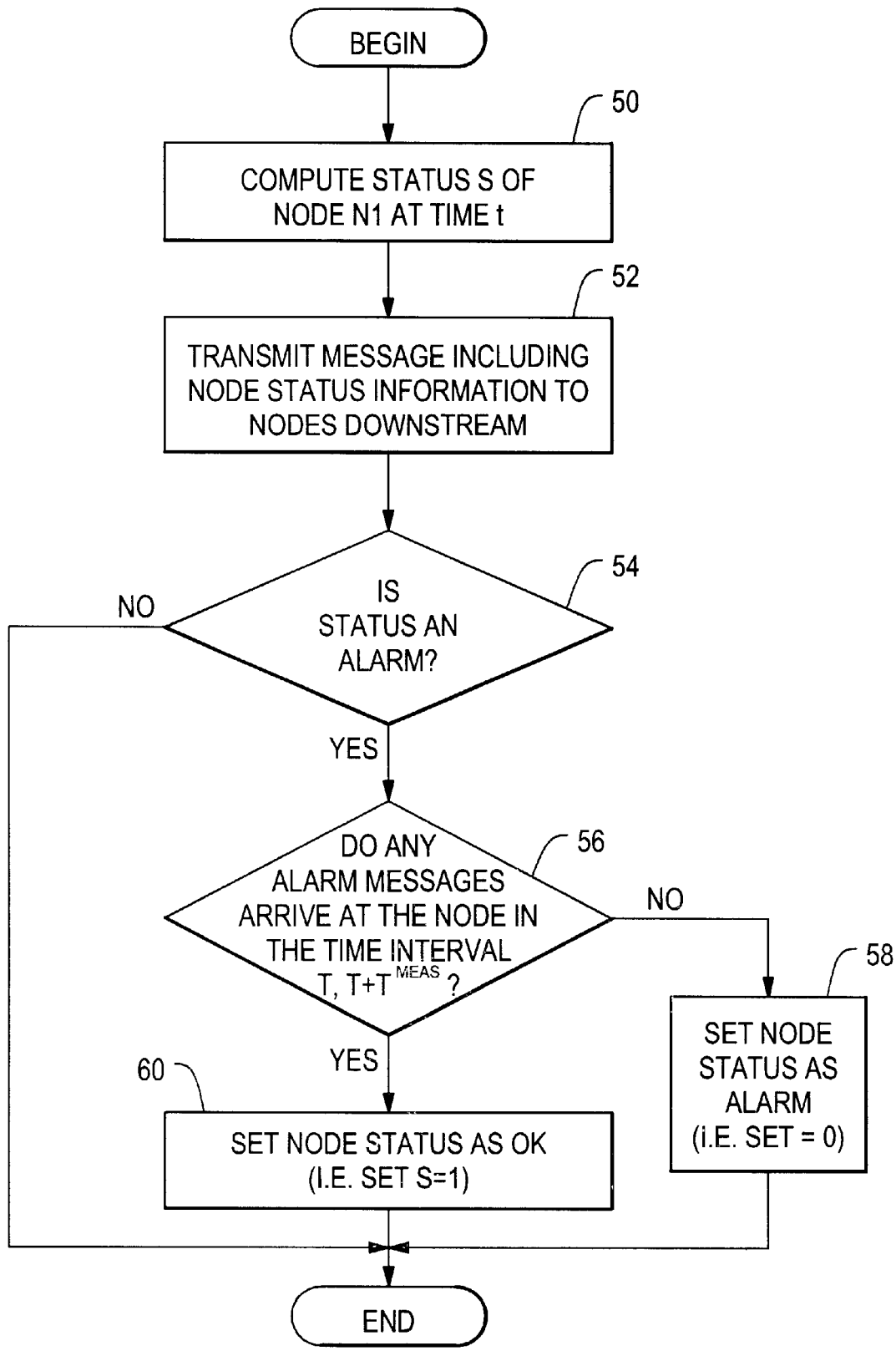
FIG. 6 is a flow diagram illustrating the processing steps performed by nodes in a network to perform attack localization.

Turning now to FIG. 6, each node in a network (such as nodes 42 in network 40 described above in conjunction with FIG. 5) repeats the following process steps and responds accordingly depending upon the node status and the status condition indicated in the messages received by the nodes.

Processing begins with Step 50 in which the status of a node N1 is computed at a time t. Processing then proceeds to Step 52 where the node transmits a message including the node status information to nodes downstream. As shown in decision block 54 if the node status is not an alarm status, then processing ends.

If in decision block 54 decision is made that the status is an alarm status then processing flows to decision block 56 where the node determines if any alarm messages have arrived at the node in a pre-determined time interval. In one particular embodiment the predetermined time interval corresponds to the period of time between when the node status of node 1 is computed, denoted as T and the measurement time after time T denoted as $T+T^{meas}$. The predetermined period of time thus corresponds to $T^{meas}$.

If the node N1 has not received any alarm messages arrive in the pre-determined time interval, then processing flows to Step 58 where the node's status is set as alarm (i.e. s=0) and processing ends. If, on the other hand, the node received an alarm message within the pre-determined time interval, then processing flows to processing block 60 where the node status is set as okay (e.g. s=1). Processing then ends.

From the above processing steps it can be seen that no node will generate an alarm until at least one attack is detected. When an attack occurs only the first node experiencing the attack will respond with an alarm. All nodes downstream from the first node receive messages which indicate that the node upstream experienced an attack. Thus, nodes downstream from the attack will respond with O.K. This network response achieves the goal of attack localization.

Figure 7:
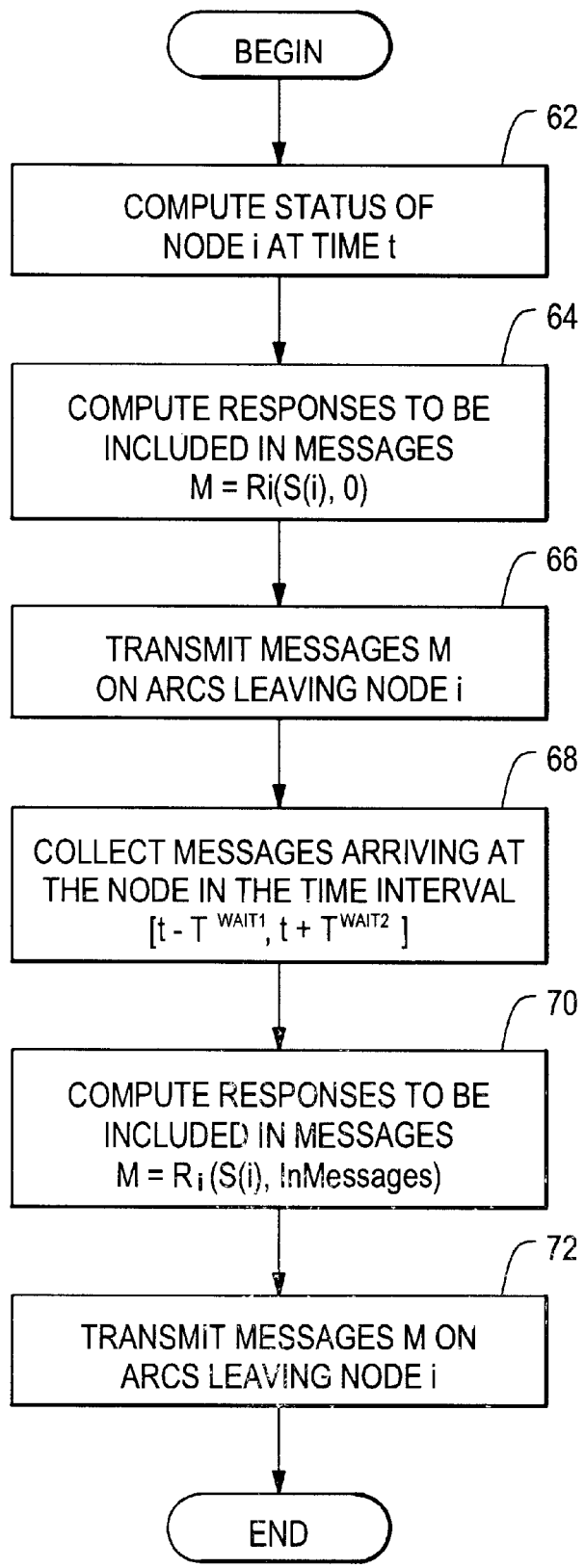
FIG. 7 is a flow diagram illustrating the processing steps performed by nodes in a network to ascertain a fault type and transmit the fault type to adjacent nodes in the network.

Referring now to FIG. 7, a general processing technique to ascertain fault types at one node and transmit the fault types to adjacent nodes in a network begins in processing block 62 where a node i computes a node status S(i) at a time t. While computing the node status any faults in the node can be ascertained and reflected in the status. Processing then flows to Step 64 where a response function R to be included in a message M is computed. The response function R is computed from the node status S(i). The node response is determined by the response function R which processes the node status information S(i) without regard to incoming messages.

Processing then flows to processing block 66 where messages M which include the response function R are transmitted on arcs leaving the node. In a preferred embodiment, the messages are transmitted on all arcs leaving the node. Processing then flows to processing Step 68 where the node collects messages arriving at the node within a pre-determined time interval. In a preferred embodiment, the predetermined time interval corresponds to $t-T^{wait1}$, $t+T^{wait2}$. The wait times $T^{wait1}$, $T^{wait2}$ are selected to result in each node having equal final processing times which can be equal to the maximum time required by any of the response functions.

Processing then flows to Step 70 where responses for inclusion in messages M are computed in accordance with a pre-determined response function R selected in accordance with the node status and the messages received within the predetermined time interval. Additional action can be taken by node S, such as switching direction of communication. Resulting messages are then transmitted on arcs leaving the node as shown in Step 72. In a preferred embodiment the messages are transmitted on all arcs which leave the node. Processing then ends.

The general processing technique, like the simple example of attack localization discussed above in conjunction with FIG. 6, is a distributed algorithm that achieves its goal through local processing and message passing. The goal of the algorithm can vary for different network examples. For example, the goal may be to raise an alarm as in the process of FIG. 6. A more complex goal may be to reroute the node immediately before and after the attacked node in the network. The techniques of the present invention are general enough to be suitable for a wide range of network goals. It should be noted that the particular processing steps performed in the nodes (such as the set of faults, the format of the messages and the node response to input messages) are defined for the particular network application and that one of ordinary skill in the art will appreciate how to provide nodes having the necessary capabilities in a particular application.

The above technique thus ascertains the fault type and transmits it to adjacent nodes in the network. It then monitors incoming messages for a specified (bounded) time interval and responds to these messages. The response of the network is particular to the particular network application.

To achieve a particular network application, a fault set F must be defined, the waiting time interval for messages (i.e. $T^{wait1}$ and $T^{wait2}$), must be defined, the format of messages must be defined, the response function R must be defined and the mode of message passing must be defined. The node can remove messages it receives from the message stream or pass all messages in the message stream.

The response function R is responsible for achieving the data transmission and security goals of the network. R is a function whose domain is the cross product of the set of node statuses and the set of message lists and whose range is the set of message lists. This may be expressed in mathematical form as:

$$Status \times MessageList \rightarrow MessageList$$

in which:

Status corresponds to the set of node statuses;

MessageList corresponds to the set of message lists (0 or more messages on whatever format is being using);

× denotes a mathematical cross product; and

→ denotes a mapping to a result space.

The response function R is preferably selected to be very fast to compute in order to provide a relatively rapid technique. Ideally, the response function R should be provided from one or more compare operations and table lookup operations performed within a network node. With this approach, any delay in identifying faults and attacks is relatively short and the network provides minimal data loss.

As mentioned above, messages can move upstream or downstream in the network. The response function receives all the messages at a node as input. It processes these messages to generate the messages for transmission from the node. The response function generates messages which the node transmits up- and down-stream. As will be discussed below, the response function R can be defined to handle a variety of different network recovery applications including but not limited to loopback recovery and automatic protection switching (APS) recovery.

In addition, the response function R may have a side effect response, such as raising an alarm or re-routing traffic at a node.

Each node, i, in a network can have a different response function denoted as $R_i$. The use of different response functions, with varying processing times, may, however, result in race conditions in the network. In general, timing problems due to different response functions can be avoided by forcing all response functions in a network to operate in the same amount of time. Thus in one approach, the processing time is set to be the maximum time required by any of the response functions. Moreover, a wait time can be added to each response function such that its final processing time is equal to the maximum time. It should be noted that the response function R may return no message, or the empty set, in which case no messages are transmitted.

Figure 7A:
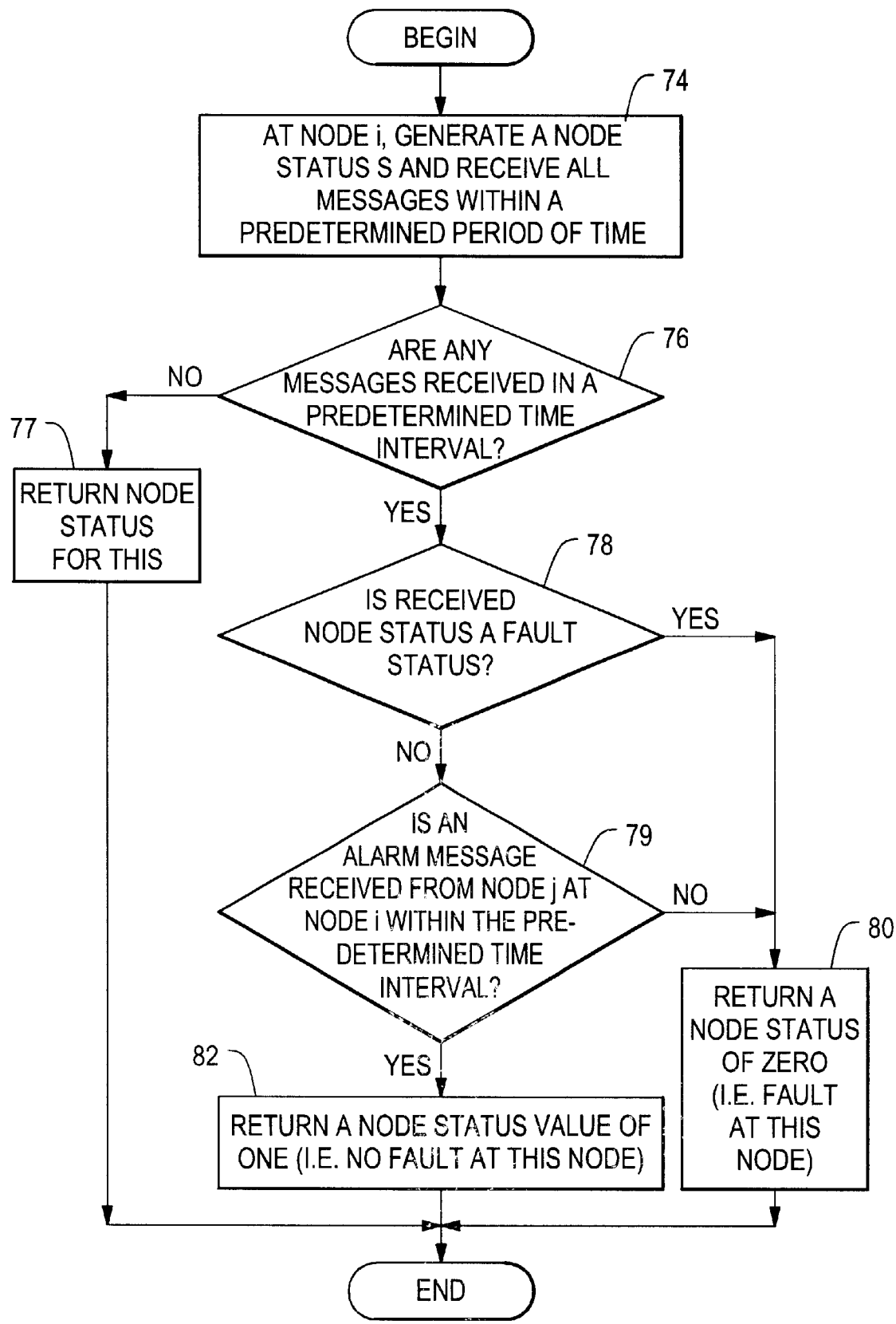
FIG. 7A is a flow diagram illustrating the processing steps performed to determine whether a node is the source of an attack or whether the source of the attack is an upstream node.

With reference to FIG. 7A, the problem of basic attack localization discussed above in conjunction with FIG. 6 is re-considered. Recall that, for this problem, the nodes have two fault types: no fault and fault (i.e. the fault set F includes a value of 1 denoting no fault at the node and a value of zero denoting fault at the node), the status S of a node i is denoted S(i) and the status must be set to a value in the fault set F. F, and messages from any node encode the status of the node. The goal for node i is to determine whether it is the source of the attack or if the attack is being carried by the data from a node upstream. Each node in the network repeats the processing steps shown in FIG. 7A.

In the general technique, the waiting times are set as follows: $T^{wait1}=0$ and $T^{wait2}=\max_i(T_i^{meas})$. Also, the message passing parameter is set to remove all messages received. The response function R may be expressed described below in conjunction with FIG. 7A. In FIG. 7A, it is assumed that the node inputs are the node status s and all messages receive within a predetermined time interval (denoted as InMessages):

Turning now to FIG. 7A, processing begins in Step 74 where the node i generates a node status and receives all messages which arrive at the node in a pre-determined time interval (denoted as InMessages). If a fault is recognized, then the node status will reflect this. Processing then flows to decision block 76 where a decision is made as to whether this is the response based on this node's status only or the status of this node together with messages received from the upstream node in a predetermined period of time.

If processing this node status only, then processing flows to step 77 where the node status is returned and the processing ends. If processing received messages, then processing flows to decision block 78 where a decision is made as to whether the node status is a fault or a no fault status (i.e., fault equals 1, no fault equals 0).

If in decision block 78 the node status received in step 74 is not a fault status, then processing flows to decision block 79 where a decision is made as to whether a message received from an upstream node j at the node i is an alarm message. If a decision is made that this is an alarm message, then processing flows to Step 82 where the node returns a node status value of 1. If decision is made that the message received from the node j is not an alarm message, then processing flows to Step 80 where the node returns a value of 0 and processing ends.

In localizing the attack, it is useful to look at the dynamics between two nodes and the connection between them. Each node monitors every connection into it. In one relatively simple example, a connection between nodes i and j, with the data flowing from i to j is examined.

Defining the time at which the data leaves node i as time t=0, the message from node i to node j about node i's failure is sent at time $T_i^{meas}$. Node j receives the data at time $T_{ij}$, and completes the measurement and sends its status at time $T_{ij}+T_j^{meas}$. At this time node j has detected an attack or it has detected no attack. Node j receives the message from node i at time $T_{ij}+T_i^{meas}$. Thus, node j can begin to process the status message from i at time $T_{ij}+\max(T_j^{meas}, T_i^{meas})$. At this time node j has information indicating whether or not node i detected an attack, and node j has enough information to determine whether or not it is the source of the attack. Processing at node j falls into one of four cases: (1) if node j has a detected no attack, then node j concludes that it is not the source of an attack; (2) if node j has detected an attack and node i has detected no attack, then node j concludes that it is the source of the attack; (3) if node j has detected an attack and node i has detected an attack, then node j concludes that it is not the source of the attack; and (4) if node j has detected an attack and has not received any messages from node i at time $t=\max(T_i^{meas}, T_j^{meas})+T_{ij}$, then node j concludes that it is the source of the attack.

It should be noted that node j completes processing at a time corresponding to $T_{ij}+\max(T_i^{meas}, T_j^{meas})+T_j^{proc}$. An exhaustive enumeration of the possible timing constraints involving $T_i^{meas}, T_j^{meas}, T_j^{proc}, T_{ij}$ and a length of the attack L, shows that node j is never owing to the technique of the present invention in the wrong state where the state is given with a delay, i.e. the node concludes at time $t+\max(T_j^{meas}, T_i^{meas})+T_j^{proc}$ that it is the source of an attack if and only if it is the source of an attack at time t.

Figure 8:
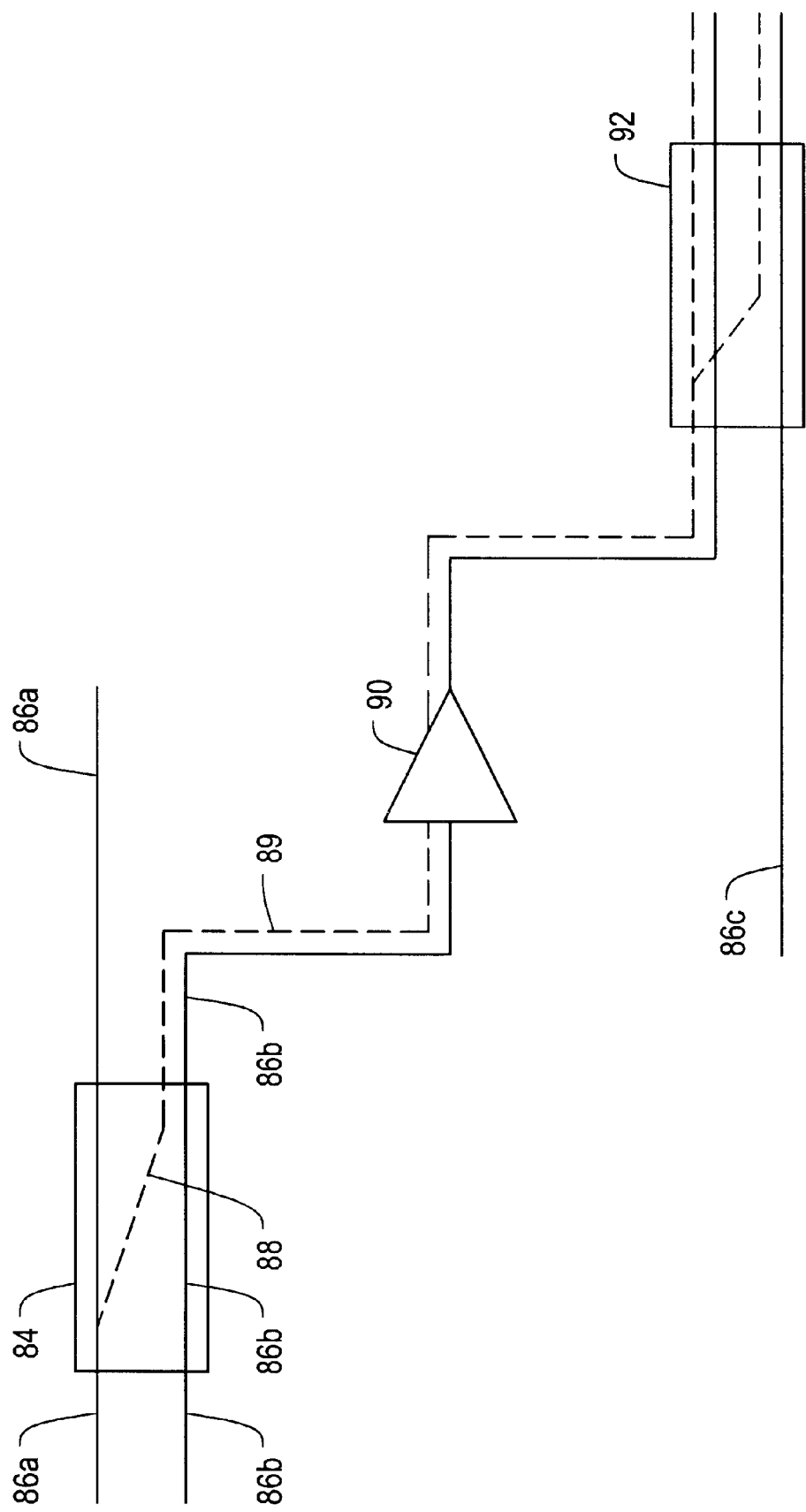
FIG. 8 is a block diagram illustrating a propagating attack which does not disrupt all nodes in a channel.
Figure 9:
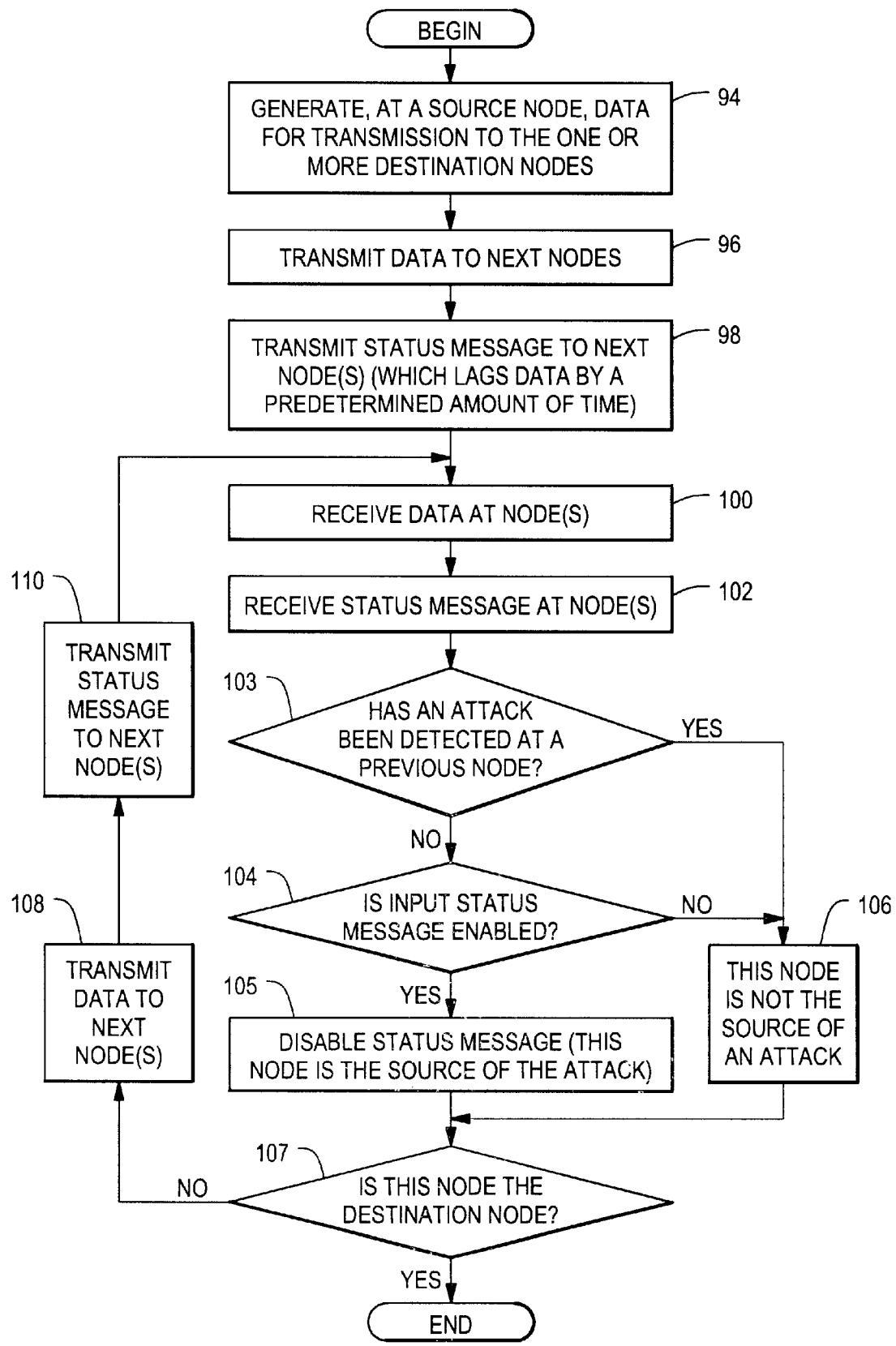
FIG. 9 is a flow diagram illustrating processing steps performed by nodes in a network to determine whether the node is the source of an attack or whether the attack is being carried by data from a node upstream.

FIGS. 8 and 9, illustrate a scenario in the processing to localize an attack when the propagating attack does not disrupt all nodes.

Referring now to FIG. 8 a portion of a network which illustrates a scenario in which the technique described in FIG. 9 may be used is shown. In this scenario, an attack is carried by a signal but the attack may not be detectable in some nodes. In this particular embodiment, consideration is given to a specific attack scenario due to crosstalk. This scenario should be distinguished from a scenario in which it is assumed that, in the case of an attack which is carried by the signal, all the nodes through which the signal is transmitted will be affected by the attack, i.e. they will suffer a failure. In the case where all nodes are affected by the attack, the basic attack localization technique described in connection with FIG. 7A can localize the source of such attacks.

In the scenario where the attack is not detectable in some nodes, as the signal traverses down the network it attacks some nodes then reaches a node which it does attack and propagates through the node to attack downstream nodes. For example, turning now to FIG. 8 consider an attack of channel 86a at node 84, a switch, in the network nodes of FIG. 8 Because of the finite isolation characteristics between two channels propagating through the switch 84 and the result and crosstalk at node 84, the output of channel 86b at node 84 is affected by the attack. The signal in channel 86b then propagates to node 90, which is an amplifier. Since this signal is the only input to the node 90, gain competition is not possible so the node 90 does not detect an attack. At node 92, however, channel 86c is once again affected by crosstalk from the attack, thus an alarm is generated. The attack does propagate. It is detected in nodes 84 and 92, but it is not detected at intermediate node 90.

It is thus desirable to apply the attack localization technique of the present invention to this problem of not all nodes detecting an attack. To isolate the salient issues, the simplest framework within which this problem can occur is considered. Nodes 84, 90, 92 have two fault types. The first fault type is no fault (i.e. F=1) and the second fault type is fault (i.e., F=0). The message simply contains a status: fault or no fault. The goal of the technique is unchanged, node 84 must determine whether it is the source of the attack or if the attack is being carried by the data from a source upstream.

The difference between this problem and the basic attack localization problem is that each node 84, 90, 92 must know of the status at all the nodes upstream from it in the network, whereas in the basic attack localization problem it is assumed that when an attack propagates, every node in the network detects a fault so the status from the single preceding node contains sufficient information from which to draw conclusions. Instead of generating messages at each node, the data is followed from its inception by a status message which lags the data by a known delay. The status message is posted by the node at which the communication starts. Once an attack is detected the status message is disabled. The lack of a status message indicates to all the nodes downstream that the source of the attack is upstream of them. Note that such a status message is akin to a pilot tone which indicates that an attack or a fault has occurred.

With the above scenario in mind, one can define the response function, R for selective attack localization, as expressed below and in conjunction with FIG. 9. It should be noted that the processing of FIG. 9 assumes that inputs to each node are the status S and all messages received within a predetermined period of time.

Before describing the processing steps, it should be noted that the nodes in the network never generate messages. They can, however, disable the status message when they detect an alarm. When the status message is disabled, any node downstream can conclude that it is not the origin of the attack.

In the general technique the waiting times $T^{wait1}$ and $T^{wait2}$ are set as $T^{wait1}=0$ and $T^{wait2}=\max_i(T_i^{meas})$ and the message passing mode is to transmit all messages.

Referring now to FIG. 9, the response function for selective attack localization is shown. Processing begins in Step 94 where data at the source node of the communication is generated for transmission to the one or more destination nodes. Processing then flows to Step 96 and 98 where the data is first transmitted to the next nodes and then a status message is transmitted to the next nodes. It should be noted that the status message lags the data message by a predetermined amount of time.

Processing then flows to step 100 where the data is received at the nodes. Immediately upon receipt of the data, the node can begin processing the data and can conclude that an attack occurred prior to processing step 102 where the messages are received at the nodes. It should be noted that the messages have a delay which is smaller than $T^{meas}$.

Processing then proceeds to decision block 103 where decision is made as to whether an attack has been detected at two nodes (i.e., the processing node and some other node). If decision is made that two nodes have not detected an attack, then processing proceeds to processing step 106 where the node is determined to not be the source of the attack. Processing then flows to decision block 107 which will be described below. If, on the other hand, in decision block 103 decision is made that an attack has been detected at two nodes, then processing flows to decision block 104.

In decision block 104 it is determined if the status message is enabled. If a node determines there is an attack, the node disables the message. If the status message has been disabled, then processing flows to processing block 106. If, on the other hand, the decision is made that the status message is enabled, then processing flows to step 105 where the status message is disabled thus indicating that this node is the source of the attack.

Processing then flows to decision block 107 where decision is made as to whether this node is the destination node. If the node is not the destination node, then the data and the status message (if not disabled) are transmitted to the next nodes as shown in processing blocks 108 and 110 and processing returns to Step 100. Steps 100 through 110 are repeated until the destination node receives data and the message. If the node is the destination node, then processing ends.

Suppose a node i is attacked at time t. The node turns off the status message at time $t+T^{wait2}+T^{proc}$. The next node, e.g. node j, receives the data stream at time $t+T_{ij}$ and waits until time $t+T_{ij}+T^{wait2}$. For an all-optical network, switching off a channel can be done in the order of nanoseconds with an acousto-optical switch. The delay between nodes in the network would typically be larger, and thus it is not believed this condition will be problematic in practice. Moreover, the network can be designed to ensure this condition is met by introducing delay at the nodes. Such a delay is easily obtained by circulating the data stream through a length of fiber.

Response to multiple fault types can be handled efficiently with a lookup table. In the case of multiple fault types, the response function R would have a pre-stored table L. Given the current node status, $s_i$, and the status of the previous node, $s_j$, the lookup table provides the appropriate response for this node, $r_i$ (i.e., L: Status of node i×Status of node j→Response.) For some applications it is useful to have different lookup tables for the next node the network, $L_n$, and the previous node in the network, $L_p$. Furthermore, the look-up tables can be extended to the domain of Status× Response which gives greater flexibility.

Figure 10:
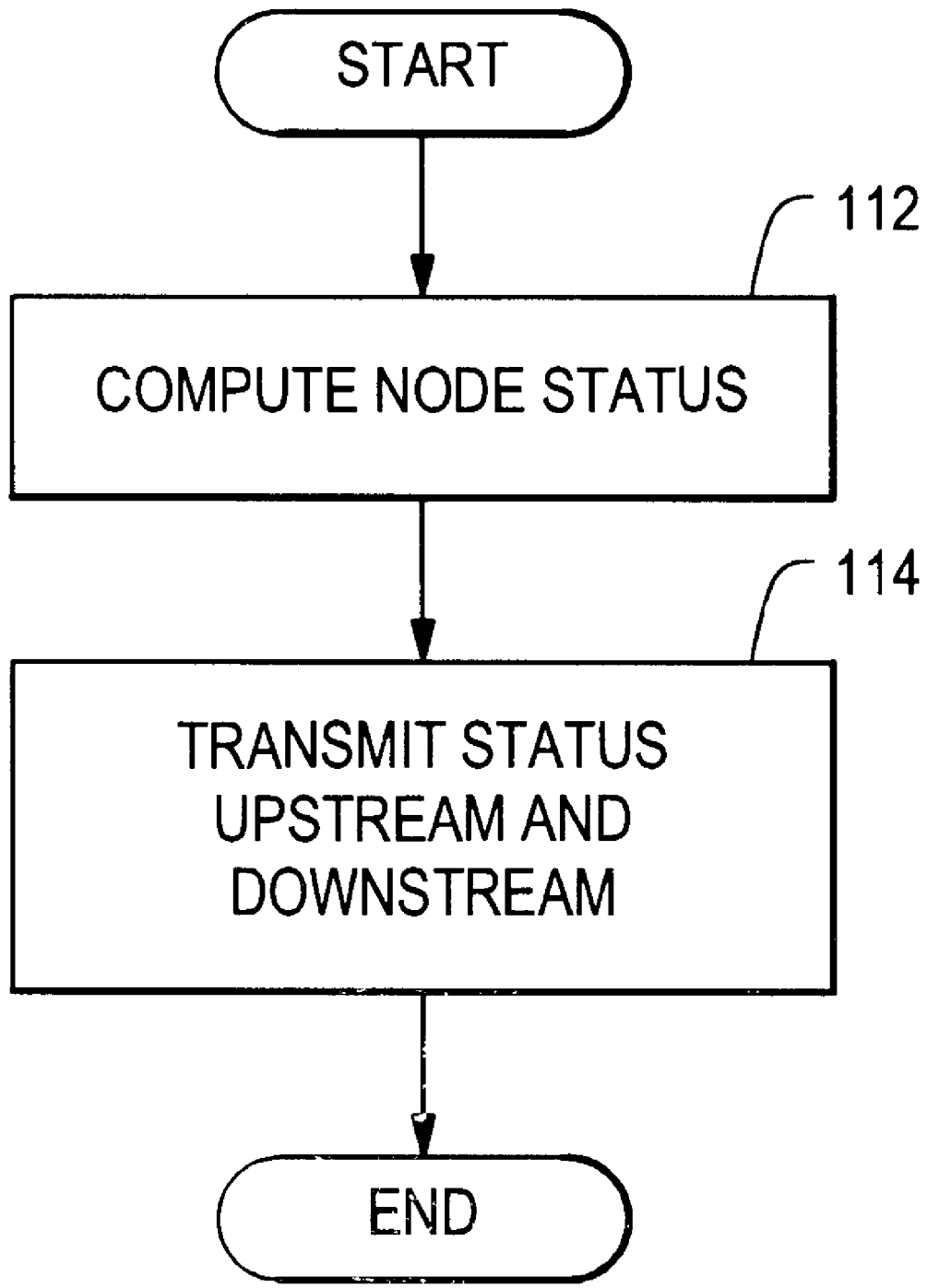
FIG. 10 is a flow diagram illustrating processing steps performed by nodes to utilize transmission of messages to nodes which are upstream in a network.
Figure 11:
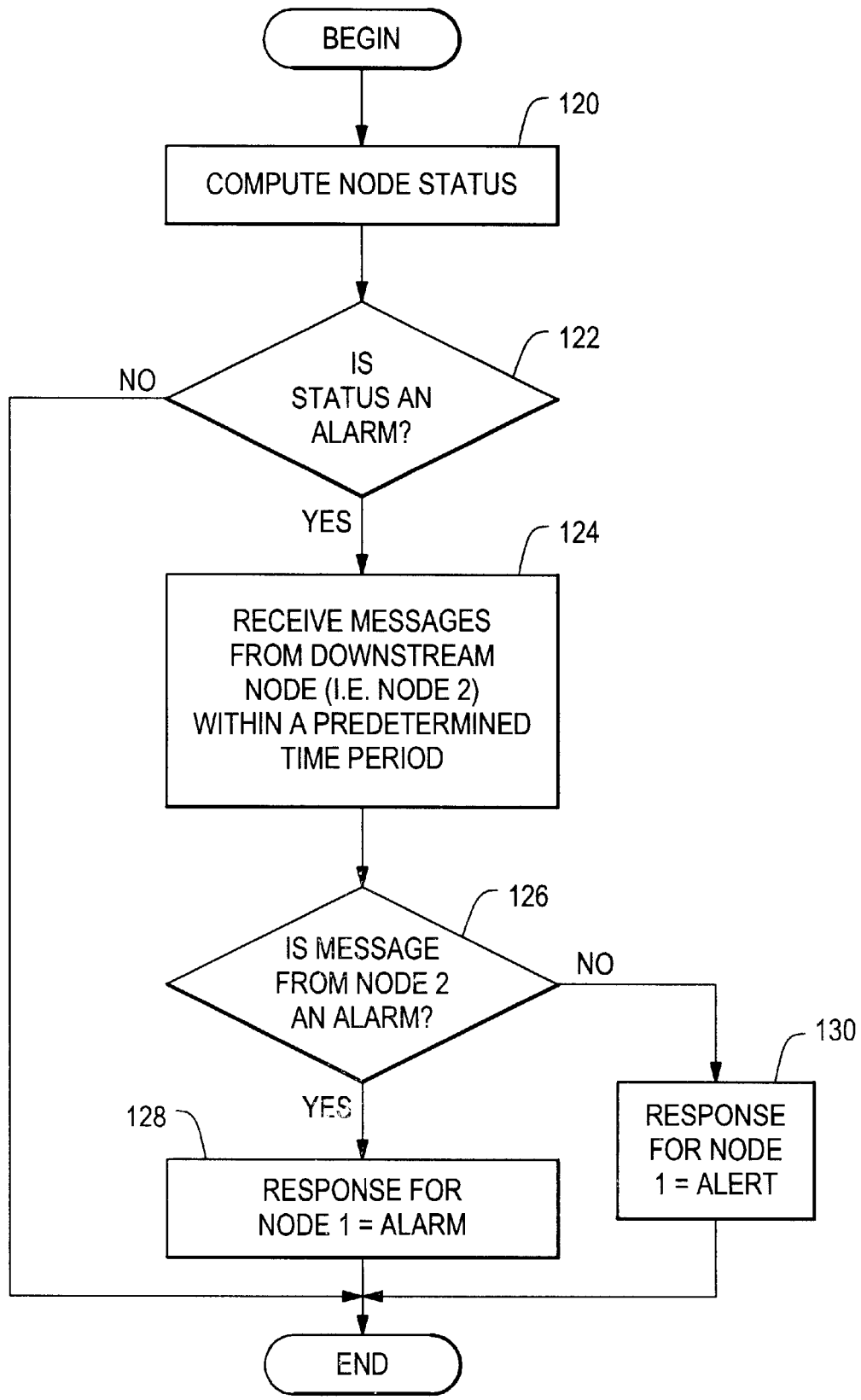
FIG. 11 is a flow diagram illustrating processing steps performed by nodes to determine whether a response should be an alarm response or an alert response.

FIGS. 10 and 11 illustrate the processing required to repress alerts and to reduce the occurrence of alarm recovery. Alarm recovering refers to the steps required to route around a node or physically send a person to fix the node typically using manual techniques such a physical repair or replacement of circuit components. Thus it is very expensive to perform alarm recovery.

Consider a node which detects signal degradation. The signal may be amplified sufficiently by the next node downstream to remain valid when it reaches the destination. Since a valid signal reaches the destination node, it may thus be undesirable to stop transmitting the signal or to re-route the node that detected this problem. Instead, it may be preferable to continue network operation as usual and generate an alert signal, but not an alarm signal. There thus exist three possible response values: (1) node status value is no fault or O.K. (e.g. S=1); (2) node status value is fault or alarm (e.g. S=0); and (3) node status value is alert. Thus, the source of an attack which is not corrected generates an alarm signal or alarm node status value whereas the source of a corrected attack generates an alert signal or alert node status value.

The attack localization technique of the present invention can achieve this behavior using upstream messages. Each node must send status messages upstream as well as downstream. Upon detecting an attack in a node downstream, messages are checked to determine if this node is the source of the attack. Upstream messages are checked to determine if the attack persists in the next node downstream. When a node detects an attack it first generates an alarm. If it later finds that the problem was corrected downstream it downgrades its alarm to an alert.

The response function for a network operating in accordance with the above concepts is described in conjunction with FIGS. 10 and 11. FIGS. 10 and 11 illustrate the processing which takes place at first and second nodes in a network. The second (node 2) is downstream from the first node (node 1). FIG. 10 illustrates the processing which takes place at node 2 and FIG. 11 Illustrates the processing which takes place at node 1. Each of the nodes repeats the respective processing steps described in conjunction with FIGS. 10 and 11.

Referring now to FIG. 10, processing begins in Step 112 where a node status is computed and proceeds to Step 114 where the node status is transmitted to upstream and downstream nodes. The processing then ends.

In FIG. 11, processing begins in processing block 120 where the a node status is computed. Processing then flows to decision block 122 which determines if the node status is an alarm status. If in decision block 122 it is determined that the node status is not an alarm or a fault status, then processing ends. If, on the other hand, in decision block 122 it is determined that the node status is an alarm or a fault status, then processing flows to step 124 where the node receives messages from a downstream node (e.g. a node 2) within a pre-determined period of time. Processing then flows to decision block 126 where decision is made as to whether a message from the second node (node 2) is an alarm message. If the message is not an alarm message, then processing flows to Step 130 where the response for node 1 is indicated to be an alert signal or an alert node status value and processing then ends. If in decision block 126 decision is made that the message from node 2 is an alarm, then processing flows to Step 128 whether a response to node 1 is an alarm signal or an alarm node status and processing then ends.

Upstream messages may follow the data stream by a significantly longer time than do downstream messages. An upstream message requires time for the data to traverse a link (i, j) from node i to the next node, j. The status of node j must be measured, and the message from node j to node i must traverse the link (i, j). Therefore the waiting time, $T^{wait2}$ in the attack localization technique is longer when upstream messages are monitored. In particular, for this scenario the value of the waiting time is preferably set to a value which takes into account such factors such as $T^{wait2} = 2*\max(T_{ij})+\max_i(T_i^{proc})$.

Figure 12:
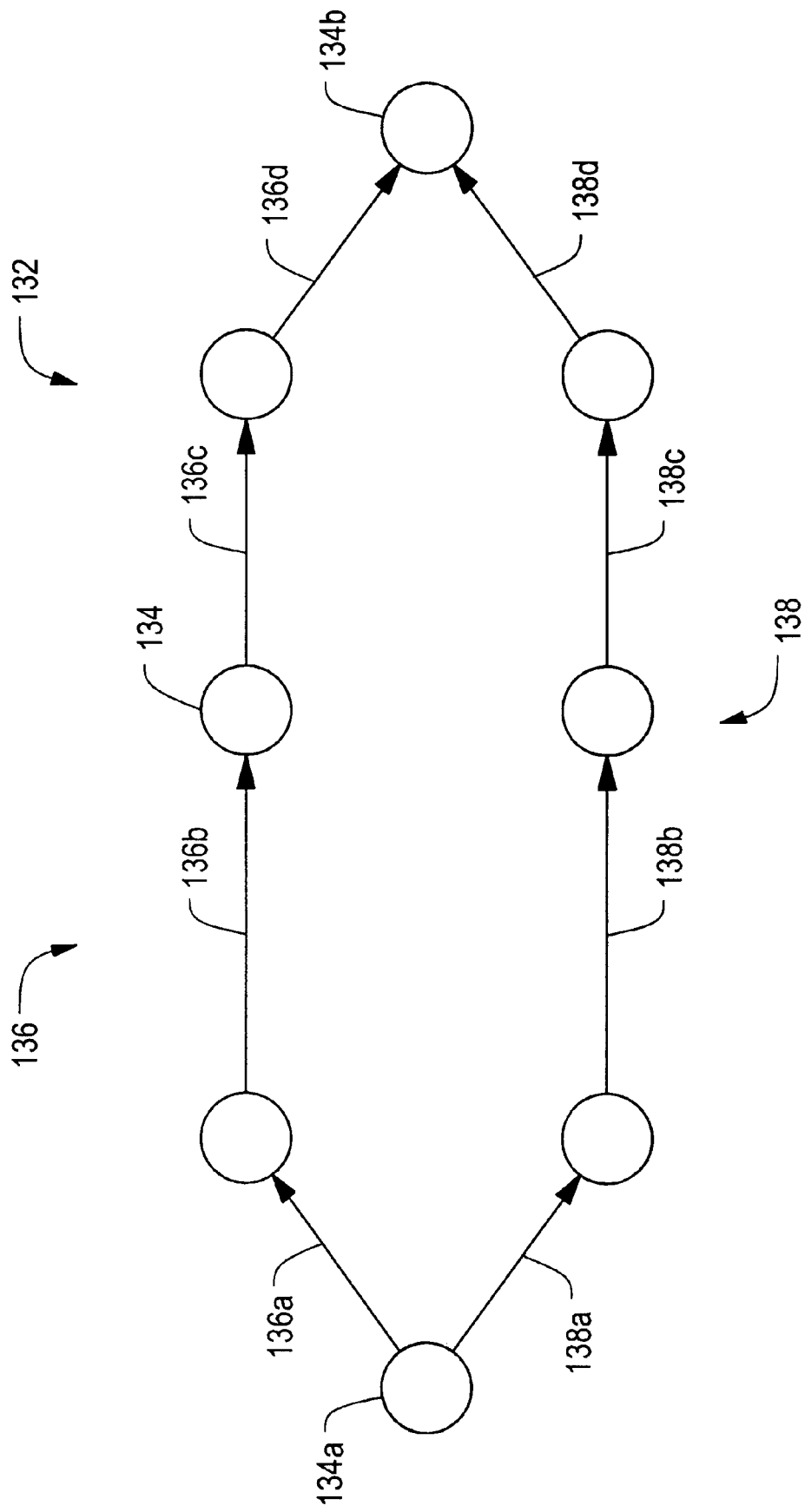
FIG. 12 is a block diagram illustrating automatic protection switching performed in accordance with the techniques of the present invention.
Figure 13:
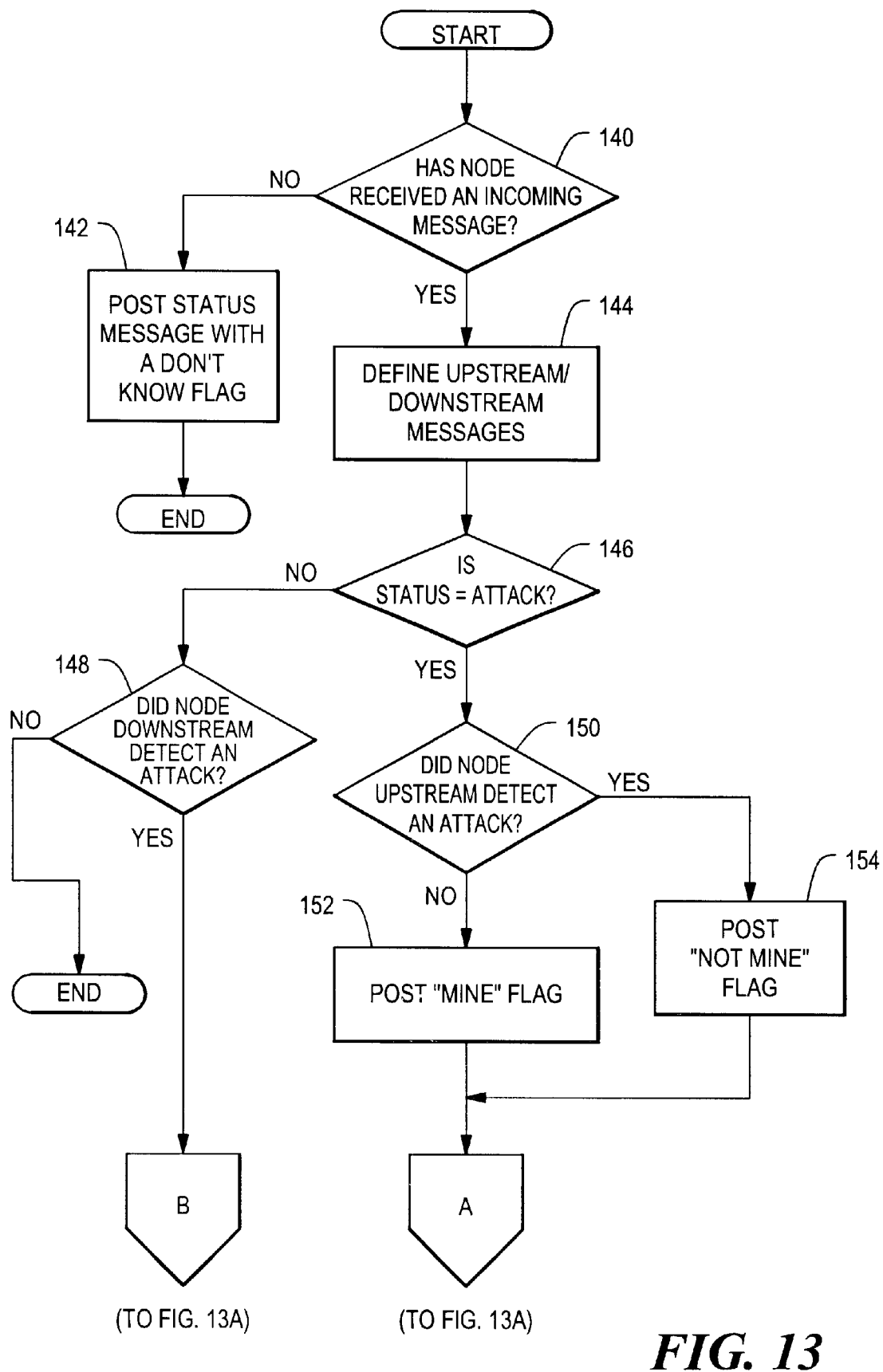
FIGS. 13, 13A are a series of flow diagrams illustrating processing steps performed by nodes to implement loopback recovery in accordance with the present invention.
Figure 14:
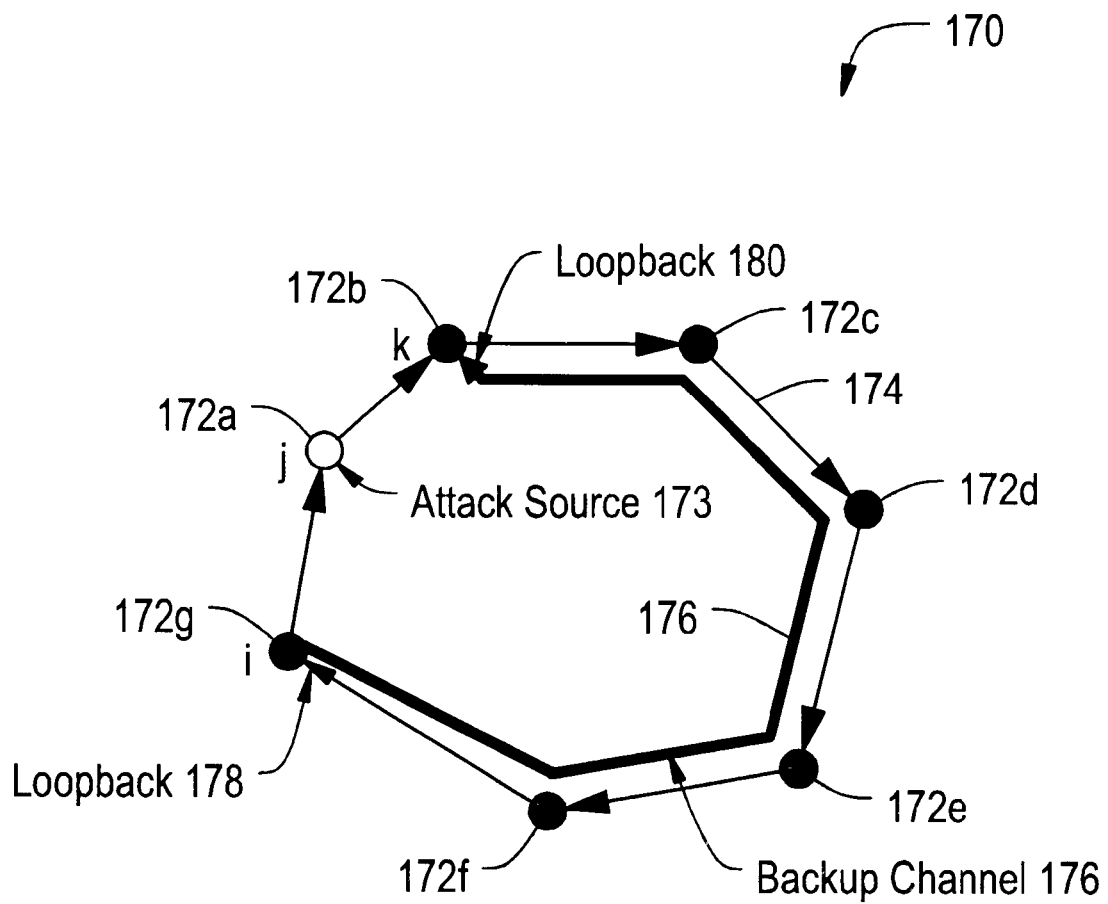
FIG. 14 is a block diagram illustrating loopback protection performed in accordance with the techniques of the present invention.

FIGS. 12–14 illustrate how the techniques of the present invention can be used for service network restoration after an attack for two important types of preplanned recovery schemes: (1) automatic path protection switching (APS) and (2) loopback protection. These two preplanned recovery schemes are the two types of network restoration used for SONET/SDH. For each network restoration, a description of how the technique can be used to perform recovery and provide the process steps that achieves the attack localization is provided.

APS allows the network to receive data on the backup stream in the event of a faulty node. In the case of an attack, service would be maintained if the attack is detected. The location of the attack, however, is unknown and restoring normal network operation may require a great deal of time or be erroneous as discussed earlier.

The attack localization technique described above in conjunction with FIG. 7A provides the network the required information to switch streams upon an attack or a fault. Furthermore, the attacked node is ascertained so that the attack can be dealt with quickly. The basic fault localization technique can be used to determine whether an attack took place along the primary path.

FIG. 12 shows a network 132 having a plurality of nodes 134 including a source node 134a and a destination node 134b. Source and destination nodes 134a, 134b are in communication via a primary path 136 provided from links 136a–136d and a backup path 138 provided from links 138a–138d.

If an attack took place along the primary path 136, there will be a message indicating the presence of such an attack and lagging the attack by a time $T^{meas}$ traveling alongside the primary path. The destination node will therefore know that there was an attack upstream and that the destination node 134B was not the source of the attack. The response of the destination node 134b will be to listen to the backup path or stream 138.

This network requires a first response function for destination nodes which can be denoted as $R_d$, and a second response function for all other nodes denoted as $R_n$. The response function $R_n$ can be set to the response function described above in conjunction with FIG. 7A. One purpose of the destination node response function is to determine if the node receives any alarm messages. If the destination node does not receive any alarm messages then the node may optionally transmit a node status message s. If the status of the node is an alarm message, then the destination node performs any necessary processes to receive data on a back up data stream.

Since the attack localization technique relies on messages arriving at nodes at specific times, a problem may arise if the two different response functions do not obey these timing conditions. Since all nodes in the network except the destination nodes use $R_n$, the timing up to the destination node will not result in a race condition. Since no node is waiting for messages from the destination nodes, any differences in time will not affect nodes in the network.

Switching routes can entail certain routing problems. Such problems can be avoided by delaying transmission on the backup path. The necessary delay on the backup path may be computed as follows. Denote by $T^{switch}$ the time it takes for the destination node 134b to switch from the primary path 136 to the backup path 138 after an alarm on the primary path 136 has been diagnosed by the destination node 134b. Let ΔT represent the difference in transmission delay between the source node 134a and the destination node 134b between the primary stream 136 and backup stream 138. It is assumed that the transmission delay is shorter on the primary path 136 and longer on the backup path 138. Regardless of where the failure happened on the primary path 136 no data will be lost in the process of detecting the problem and switching to the backup stream 138 as long as the data on the backup stream is transmitted with a delay of at least $$^{max} \text{ all nodes in the primary path } (T_i^{meas})+T^{switch}-\Delta T.$$

Those of ordinary skill in the art will appreciate of course that in some embodiments, the transmission delay is longer on the primary path 136 and shorter on the backup path 138 and that appropriate changes in processing may be necessary owing to such a condition.

If all nodes 134 have the same $T_i^{meas}$, then no matter where the failure occurs in the primary path 136, there is always the same delay between the data stream flowing on the primary path 136 and the data stream flowing on the backup data path 138 after APS. Therefore, the destination node 134b need not to adapt its response to the location of the failure. Independence from the location of the failure is very advantageous for scalability of the network. Moreover, having a single delay for all node results in simple optical hardware at the destination node 134b since adapting to different delays on the fly requires significant complexity at the destination node.

Figure 13A:
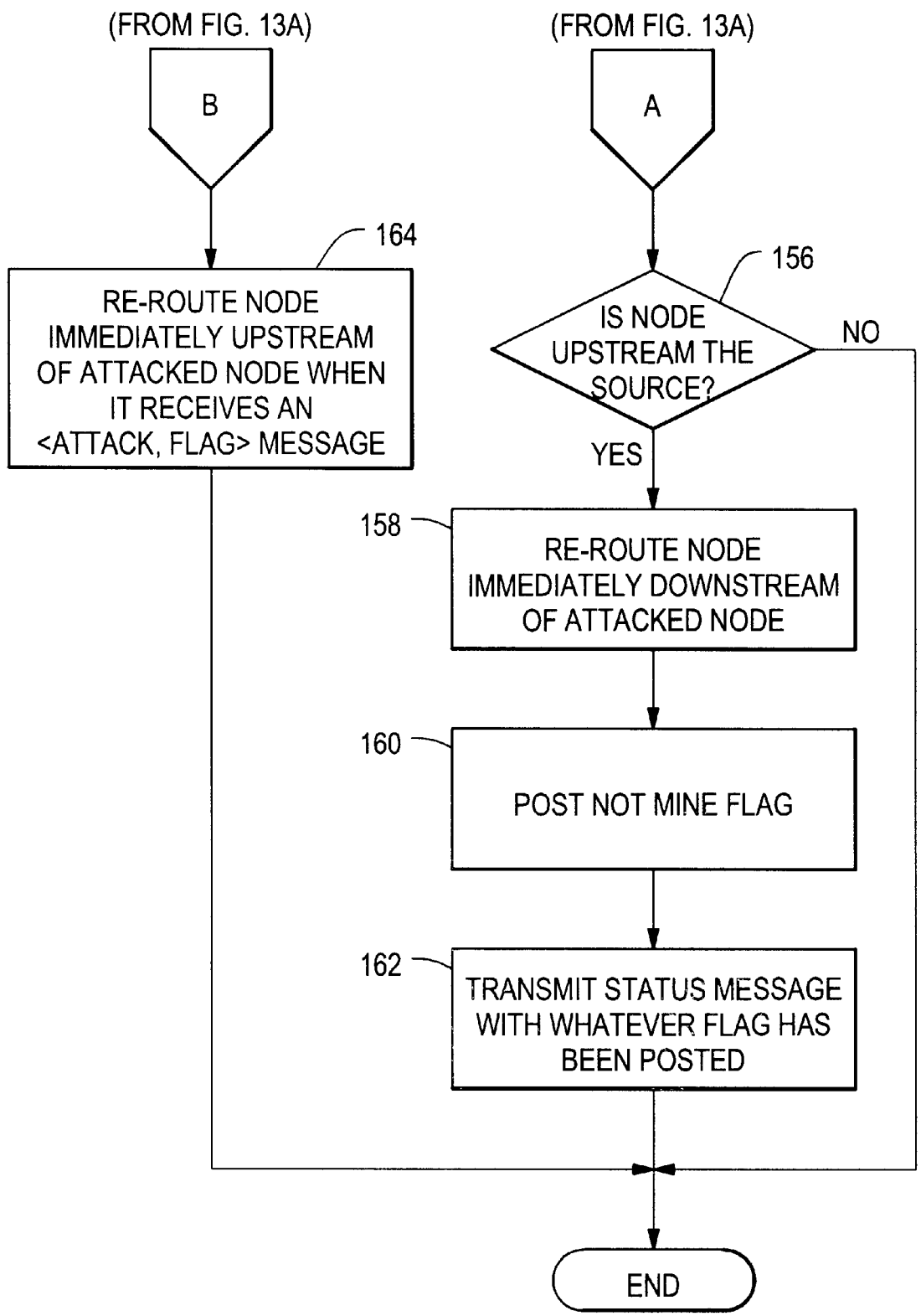

Referring now to FIGS. 13 and 13A, response function processing in accordance with the techniques of the present invention to provide loop-back restoration in the case of a failure is shown. It should be noted that loop-back restoration in the case of a failure is performed by the two nodes adjacent to the failure.

Processing begins in decision block 140 where decision is made as to whether a node has received an incoming message. If the node has not received an incoming message, then processing proceeds to Step 142 where the node posts a status message which indicates that the node has no information concerning the identity of a source attack node. The status message may include, for example, with a don't-know flag. Processing then ends.

If in decision block 140 decision is made that the node has received at least one incoming message, then processing proceeds to Step 144 where each of the at least one incoming messages to be sent to both upstream and downstream nodes are shown. Processing then flows to decision block 146 where decision is made as to whether the status included in the message is an attack status. If a decision is made that the status is not an attack status, then processing flows to decision block 148 where decision is made as to whether the downstream node detected an attack.

If the downstream node did not detect an attack, then processing ends. If, on the other hand, in decision block 148, decision is made that the downstream node detected an attack, then processing flows to processing block 164 (FIG. 13A) where the node immediately upstream of the attack node is re-routed when it receives a message having an indicator with a value which indicates that the node is under attack (e.g. the node receives an attack flag message). Thus, the response processor causes a re-routing of the node immediately upstream of the attacked node when it receives an {attack, flag} message. The upstream nodes need not wait for an {attack, mine} message because the attack does not propagate upstream. Processing then ends.

If in decision block 146 decision is made that the status is an attack, then processing flows to decision block 150 where decision is made as to whether the node upstream detected an attack. If the node upstream did not detect an attack, processing flows to decision block 152 where the node posts a status message which indicates that the node has information concerning that identity of a source attack node. The status message may include, for example, a mine flag meaning that this node is the source of the attack. If, on the other hand, a decision is made that the upstream node detected an attack, then processing flows to step 154 where the node posts a status message which indicates that the node has information concerning that identity of a source attack node. The status message may include, for example, a not-mine flag meaning that this node is not the source of the attack.

Processing then flows to decision block 156 where decision is made as to whether the node upstream is the source of the attack. If decision is made that the node upstream is not the source of the attack, then processing ends. If, on the other hand, decision is made that upstream is the source of the attack, then processing flows to step 158 where the node immediately downstream of the attack node is re-routed. Thus, when an {Attack,Mine} message is received from the source node the response processor causes a re-routing of the node immediately downstream of the attacked node. Processing then flows to step 160 where the node posts a not-mine flag and then to step 162 where a status message is transmitted with whatever flag has been posted. Processing then ends.

Referring now to FIG. 14, loopback restoration, in the case of a failure, is performed by the two nodes adjacent to the failure. A network 170 includes a plurality of network nodes 172a–172g with node, 172f corresponding to a source node and node 172d corresponding to a destination node. A data stream flows between the nodes on a primary stream or channel 174. If node 172a experiences a failure, the primary data stream 174 is re-routed at node 172g to travel on a backup channel 176. Simultaneously, the node 172b receives information on the backup stream 176. This restoration maintains the connectivity of the ring network 170 and allows the data to reach the intended destination despite the failure at node 172a.

Considering an attack at node 172a, as shown in FIG. 14. Node 172g is immediately upstream of node 172a which is the source of the attack. Node 172b is immediately downstream of node 172a. The attack may spread so that each of nodes 172b–172d will detect an attack while it will not be attacked directly. Each of these detected attacks will cause loopback recovery, resulting in multiple loopback and no data transmission. Thus, for these and other reasons discussed above, detection of attacks as failures and utilization of a conventional loopback operation might not offer recovery from attack.

The technique of the present invention is applied to loopback in the following way. In the event of an attack each node 172a–172g attempts to determine whether it is immediately upstream or immediately downstream of the attacked node. In the network 170, the node 172g finds that the node 172a is the source of an attack (by monitoring upstream messages) and re-routes. The node 172b also finds that the node 172a is the source of the attack and re-routes. All other nodes 172c–172f find that they are not immediately upstream or downstream of the attack. Thus, these the nodes 172c–172f do not re-route despite the detected attack.

In the attack localization technique the wait time $T^{wait2}$ can be set to: $T^{wait2}=2*\max(T_{ij})+\max_i(T_i^{proc})$ which gives the node time to monitor backward messages. Messages will consist of the couple (s, flag) where s is the status of the node (one of O.K. or Attack), and the status flag belongs to the set status flags {DontKnow,Mine,NotMine}. The status flags indicate whether the transmitting node is responsible for the fault or not, or that the node does not yet know if it is responsible for the fault. For this case we will remove messages from the message stream when they are processed. The response function R is as discussed above in conjunction with FIGS. 13–13A.

Table 1 illustrates the messages posted at nodes 172a (node j), 172b (node k) 172g (node i), and 172c (node 1), when an attack occurs at the node 172a. For simplicity it is assumed that all measurement are negligibly small and all transmission times are equal. This allows examination of the nodes at discrete time steps.

Let the attack at node 172a occur at time t. At this time only node 172a detects an attack. At time t+1 node 172a receives an O.K. message from node 172g and finds it is the source. Node 172b detects an attack and receives an attack message from node 172a indicating that it is not the source of the attack. Node 172g receives the attack message from node 172a and re-routes. At time t+2 node 172b finds that the node 172a is the source of the attack and the node 172b is the next node downstream and re-routes. The node 172c also detects the attack at time t+2 and receives the {Attack, NotMine} message from the node 172b, thereby finding that it is not the source. Since the message indicates that the node 172b is not the source, the node 172c does not re-route.

The timing issues are important, since the nodes 172b, 172g act independently. If the node 172b performs loopback before the traffic on the backup channel has reached the node 172b, there will simply be a delay in restoration but no data will be lost. Loopback could fail, however, if the node 172b performs loopback after the loopback traffic from the node 172g has arrived at the node 172b. There could be loss of data on the backup channel upon arrival at the node 172b. It can be shown, however, that this eventuality cannot occur.

Let t be the time at which the attack hits the node 172a. At time $t+\max(T_i^{meas}, T_j^{meas})+T_j^{proc}$, the node 172a will send a message to the node 172g informing it that the source of the attack is at the node 172a. The node 172g will receive the message that the node 172a is the source of the attack at time $t+\max(T_i^{meas}, T_j^{meas})+T_{ij}$ and will finish $T_i^{proc}$ later. If it takes the node 172g a time period corresponding to about $T_i^{loop}$ to perform loopback, then the node 172g will perform loopback at time t+max $(T_i^{meas}, T_j^{meas})+T_j^{proc}+T_i^{proc}+T_{ij}+T_i^{loop}$. The node 172b will know that it is not the source of the attack at time t+max $(T_j^{meas}, T_k^{meas})+T_k^{proc}+T_{jk}$. However, the information that is needed by the node 172b is whether or not the node 172a is the source of the attack.

The node 172b will know that the node 172a is the source of the attack and perform loopback at time t+max $(T_i^{meas}, T_j^{meas})+T_j^{proc}+T_{jk}+T_k^{loop}$. It may be assumed that all the times $T^{loop}$ are equal, all of the $T^{meas}$ are equal and all of the $T^{proc}$ are equal. Such an assumption may be made without loss of generality because one could take the maximum of all these time periods and delay the others to match the maximum. One can assume, as would be the case in AONs, that transmission delays are proportional to length. From elementary geometry, it is known that $[T_{ij}-T_{jk}]$ is less than or equal to the transmission time from the node 172g to the node 172b. Therefore, no traffic from the node 172g to the node 172b placed on the backup channel by loopback will arrive at the node 172b before the node 172b has performed loopback.

TABLE 1

| time | node 172g | node 172a | node 172b | node 172c |
|------|-----------|-----------|-----------|-----------|
| t | (O.K.,DontKnow) | (Attack,DontKnow) | (O.K.,DontKnow) | (O.K.,DontKnow) |
| t + 1 | (O.K.,NotMine)* | (Attack,Mine) | (Attack,NotMine) | (O.K.,DontKnow) |
| t + 2 | (O.K.,NotMine)* | (Attack,Mine) | (Attack,NotMine)* | (Attack,NotMine) |
| t + 3 | (O.K.,NotMine)* | (Attack,Mine) | (Attack,NotMine)* | (Attack,NotMine) |

Table 1 shows messages and the side-effects of operating the response function R in conjunction with the processes and techniques described above in conjunction with FIGS. 13, 13A when an attack occurs at time t at the node 172a. A decision to re-route is indicated with an asterisk (*).

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method for performing attack localization in a network having a plurality of nodes, the method comprising the steps of:

determining, at each of the plurality of nodes in the network, if there is an attack on the node;

transmitting one or more messages between first and second nodes wherein said first node is upstream from said second node and wherein each of the one or more messages indicates that the node transmitting the message detected an attack at the message transmitting node; and processing messages received in a message processing one of the first and second nodes to determine if the attack was passed to the message processing node from another node or if the message processing node is a first node to sustain an attack on a certain channel.

2. The method of claim 1 wherein prior to the step of transmitting the one or more messages, the method comprises the step of transmitting data between said first and second nodes.

3. The method of claim 2 wherein the localization of an attack at the message transmitting node requires a predetermined processing time at wherein the predetermined processing time includes:

a detection time to detect the input and output signals and processing of the results of that detection, and a time delay associated with generating one or more messages for transmission to at least one of an upstream and a downstream node.

4. The method of claim 3 wherein said detection time comprises:

a time for capturing one or more messages from upstream and/or downstream nodes; and a time to process the captured messages together with local information.

5. The method of claim 4 wherein:

the first node is upstream of the second node on a first channel which is an attacking channel;

both the first and second nodes identify the attacking channel;

wherein the first node transmits to a second node a finding that the channel is nefarious and the interval between the time when the attack hits the second node and the second node receives a message from the first node that the attack also hit the first node is not greater than a first predetermined period of time; and wherein the localization of the attack commences at the second node as soon as the attack reaches the second node and the elapsed time until the second node identifies the attack and determines whether the first node also detected that attack is not greater than a second predetermined period of time.

6. A method for processing information in a node of a communication network comprising the steps of:

(a) computing a node status S of a node N1 at a time T.

(b) transmitting a message including the node status information S to nodes downstream;

(c) determining if the status information indicates an alarm status for the node;

(d) in response to the status information not indicating an alarm status for the node, ending processing;

(e) in response to the status information indicating an alarm status at the node performing the steps of:

(1) determining if any alarm messages arrive at the node within a predetermined time interval;

(2) in response to no alarm messages arriving at the node within the predetermined time interval, setting the node status of the node to alarm; and (3) in response to at least one alarm message arriving at the node within the predetermined time interval setting the node status of the node to no alarm.

7. A method for processing information in a node of a communications network comprising the steps of:
   (a) computing a status of a node at a first time;
   (b) transmitting the one or more messages including the node status on arcs leaving the node;
   (c) collecting all messages arriving at the node within a predetermined time interval;
   (d) computing at least one response to be included in at least one message wherein each of the at least one responses depends upon a node status of the node and information contained in the messages which arrived at the node within the predetermined time interval; and
   (e) transmitting at least one message including one of the at least one responses on arcs leaving the node.

8. The method of claim 7, wherein the step of transmitting messages on arcs leaving the node includes the step of transmitting messages on all arcs leaving the node.

9. The method of claim 1 wherein said message processing step comprises the steps of:
   (a) determining a status of the message processing node; and
   (b) concluding that said attack was passed to the message processing node if said status indicates an alarm and at least one message was received within a predetermined period of time by the message processing node from the message transmitting node indicating an alarm at the message transmitting node.

10. The method of claim 9 wherein said message processing step further comprises the step of:
    (c) concluding the message processing node was the first node to sustain an attack on said channel if said status indicates an alarm and the message processing node does not receive a message indicating an alarm status at another node within the predetermined period of time.

11. Apparatus provided at each of a plurality of nodes of a network for identifying the location of a fault in the network, said apparatus comprising:
    (a) a fault detector for detecting a fault at a respective node and for providing a fault status signal indicating whether or not said node has experienced a fault and for transmitting said fault status signal to at least one other node in said network; and
    (b) a response processor responsive to said fault status signal of the respective node and to a message received by said node from another node in said network within a predetermined time for updating the fault status signal of the respective node.

12. The apparatus of claim 11 wherein said response processor is operative to provide an updated fault status signal indicating that the respective node is the source of the fault if the fault status signal indicates detection of a fault and either (a) the respective node does not receive a message from another node in the network within the predetermined period of time or (b) the respective node receives a message from another node in the network within the predetermined time indicating that the other node did not experience a fault.

13. The apparatus of claim 11 wherein said response processor is operative to provide an updated fault status signal indicating that the respective node is not the source of the fault if the fault status signal indicates detection of a fault and the respective node receives a message from another node in the network within the predetermined time indicating that the other node experienced a fault.

14. A network comprising:
    a plurality of nodes, each one comprising:
        a fault detector for providing a fault status signal indicative of whether or not said node has experienced a fault; and
        a response processor responsive to said fault status signal and to one or more messages received at said node from other nodes in said network for determining whether or not said fault originated at said node or whether said fault was propagated by the other node; and
    at least one channel interconnecting the plurality of nodes.

15. A method for detecting the source of a fault in a network comprising a plurality of nodes, said method comprising the steps of:
    (a) generating at a source node data for transmission to a destination node;
    (b) transmitting said data to a next node within said network;
    (c) transmitting a status message from the source node to said next node;
    (d) receiving said data at said next node;
    (e) receiving said status message at said next node;
    (f) said next node determining whether an attack has been detected at said next node and said source node;
    (g) determining whether a status message of said next node is enabled and:
        (1) if the status message is enabled, disabling said status message in order to provide an indication that the next node is the source of the attack and transmitting the data and status message to a further next node if the next node is not the destination node; and
        (2) if the status message disabled, providing an indication that the next node is not the source of the attack.

16. A method for optimizing alarm recovery, comprising the steps of:
    computing the status of a node;
    determining whether the computed node status is an alarm status;
    receiving a message at the node from a downstream node within a predetermined period of time;
    determining whether said received message is an alarm message;
    providing an alarm signal if said received message is an alarm message and providing an alert signal if said received message is not an alarm message.

* * * * *

UNITED STATES PATENT AND TRADEMARK OFFICE
CERTIFICATE OF CORRECTION

PATENT NO. : 6,442,694 B1
DATED : August 27, 2002
INVENTOR(S) : Bergman et al.

It is certified that error appears in the above-identified patent and that said Letters Patent is hereby corrected as shown below:

<u>Title page,</u>
Item [57], ABSTRACT,
Line 14, delete "Since the" and replace with -- The --.

<u>Column 1,</u>
Line 53, delete "owing" and replace with -- owing to the --.
Line 56, delete "signal ports" and replace with -- signal ports --.

<u>Column 7,</u>
Line 17, delete "network's" and replace with -- networks --.
Line 45, delete "diagnostic" and replace with -- diagnostics --.

<u>Column 9,</u>
Line 6, delete "upstream." and replace with -- upstream; --.
Line 52, delete "message", and replace with -- "message" --.
Line 57, delete "leads or" and replace with -- leads --.

<u>Column 12,</u>
Line 12, delete "land" and replace with -- and --.
Line 14, delete "detection the" and replace with -- detection of the --.

<u>Column 13,</u>
Line 44, delete "there is defined a" and replace with -- which is less than a defined --.

<u>Column 14,</u>
Line 2, delete "to explicitly" and replace with -- to --.
Line 2, delete "account the" and replace with -- account explicity the --.

<u>Column 15,</u>
Line 12, delete "messages arrive" and replace with -- messages --.

<u>Column 16,</u>
Line 36, delete "being using" and replace with -- being used --.

<u>Column 17,</u>
Line 20, delete "expressed" and replace with -- expressed as --.
Line 24, delete "):" and replace with -- ). --.
Line 67, delete "has a detected" and replace with -- has detected --.

UNITED STATES PATENT AND TRADEMARK OFFICE
CERTIFICATE OF CORRECTION

PATENT NO. : 6,442,694 B1
DATED : August 27, 2002
INVENTOR(S) : Bergman et al.

It is certified that error appears in the above-identified patent and that said Letters Patent is hereby corrected as shown below:

Column 18,
Line 35, delete "the network it attacks some nodes" and replace with -- the network --.
Line 39, delete "at node 84, a switch," and replace with -- at node 84 --.
Line 40, delete "FIG. 8" and replace with -- FIG. 8. --.

Column 20,
Line 23, delete "recovering" and replace with -- recovery --.
Line 25, delete "such a" and replace with -- such as a --.
Line 58, delete "Illustrates" and replace with -- illustrates --.
Line 67, delete "the a" and replace with -- the --.

Column 22,
Line 47, delete "not to adopt" and replace with -- not adapt --.
Line 50, delete "node" and replace with -- nodes --.
Line 66, delete "with a" and replace with -- a --.

Column 23,
Line 66, delete "considering" and replace with -- consider --.
Line 36, delete "measurement" and replace with -- measurements --.

Signed and Sealed this

Eleventh Day of February, 2003

JAMES E. ROGAN
*Director of the United States Patent and Trademark Office*